(12) United States Patent
Maeda et al.

(10) Patent No.: US 8,880,759 B2
(45) Date of Patent: Nov. 4, 2014

(54) APPARATUS AND METHOD FOR FRAGMENTING TRANSMISSION DATA

(71) Applicant: Fujitsu Limited, Kawasaki (JP)

(72) Inventors: Takuya Maeda, Kanazawa (JP); Tetuya Yokoyama, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 40 days.

(21) Appl. No.: 13/789,851

(22) Filed: Mar. 8, 2013

(65) Prior Publication Data

US 2013/0262713 A1    Oct. 3, 2013

(30) Foreign Application Priority Data

Mar. 30, 2012  (JP) ................... 2012-083171

(51) Int. Cl.
 *G06F 3/00* (2006.01)
 *G06F 13/00* (2006.01)
 *G06F 13/38* (2006.01)
(52) U.S. Cl.
 CPC .................... *G06F 13/385* (2013.01)
 USPC .................. 710/30; 710/33; 710/34
(58) Field of Classification Search
 CPC ............. G06F 13/385; H04L 49/3072
 See application file for complete search history.

(56) References Cited

U.S. PATENT DOCUMENTS

2007/0041321 A1    2/2007   Sasaki et al.

FOREIGN PATENT DOCUMENTS

| JP | 9-312668 | 12/1997 |
|---|---|---|
| JP | 2004-208119 | 7/2004 |
| JP | 2005-303516 | 10/2005 |
| JP | 2007-53564 | 3/2007 |

*Primary Examiner* — Kris Rhu
(74) *Attorney, Agent, or Firm* — Staas & Halsey LLP

(57) ABSTRACT

An apparatus includes first, second, and spare ports, where first data having a data length less than a predetermined value is transmitted from the first port and second data having a data length not less than the predetermined value is transmitted from the second port. The apparatus obtains a first determination result indicating whether input data is the first data or the second data and a second determination result indicating whether a transmission rate of each of the first and second ports is equal to or greater than a threshold. The apparatus sorts the input data to one of the first, second, and spare ports, based on the first and second determination results. The apparatus fragments the second data and transmit the fragmented second data to the spare port when both the first data and the second data are sorted to the spare port.

7 Claims, 19 Drawing Sheets

| PORT | TYPE | LINK STATE | USAGE STATUS | |
|---|---|---|---|---|
| 411 — V | SHORT | UP | 01 | |
| 412 — W | RESERVE | UP | 01 | ~416 |
| 413 — X | RESERVE | UP | 11 | ~417 |
| 414 — Y | RESERVE | UP | 10 | ~418 |
| 415 — Z | LONG | UP | 10 | |

| PORT | TYPE | LINK STATE | USAGE STATUS |
|---|---|---|---|
| V | SHORT | UP | 01 |
| W | RESERVE | UP | 01 |
| X | RESERVE | UP | 00 |
| Y | RESERVE | UP | 10 |
| Z | LONG | UP | 10 |

421

410B

| PORT | TYPE | LINK STATE | USAGE STATUS |
|---|---|---|---|
| V | SHORT | UP | 01 |
| W | RESERVE | UP | 01 |
| X | RESERVE | DOWN | 00 |
| Y | RESERVE | UP | 10 |
| Z | LONG | UP | 10 |

422

410C

| PORT | TYPE | LINK STATE | USAGE STATUS |
|---|---|---|---|
| V | SHORT | UP | 01 |
| W | RESERVE | UP | 01 |
| X | RESERVE | UP | 00 |
| Y | RESERVE | UP | 10 |
| Z | LONG | UP | 10 |

423

FIG. 16
410D
| PORT | TYPE | LINK STATE | USAGE STATUS |
|---|---|---|---|
| V | SHORT | UP | 01 |
| W | RESERVE | UP | 01 |
| X | RESERVE | UP | 00 |
| Y | RESERVE | UP | 10 |
| Z | LONG | UP | 10 |
421
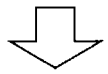
410E
| PORT | TYPE | LINK STATE | USAGE STATUS |
|---|---|---|---|
| V | SHORT | UP | 01 |
| W | RESERVE | UP | 01 |
| X | RESERVE | UP | 10 |
| Y | RESERVE | DOWN | 00 |
| Z | LONG | UP | 10 |
432
431  433
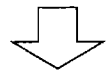
410F
| PORT | TYPE | LINK STATE | USAGE STATUS |
|---|---|---|---|
| V | SHORT | UP | 01 |
| W | RESERVE | UP | 01 |
| X | RESERVE | UP | 10 |
| Y | RESERVE | UP | 00 |
| Z | LONG | UP | 10 |
435
434  436

FIG. 17
410G
| PORT | TYPE | LINK STATE | USAGE STATUS |
|---|---|---|---|
| V | SHORT | UP | 01 |
| W | RESERVE | DOWN | 00 |
| X | RESERVE | DOWN | 00 |
| Y | RESERVE | DOWN | 00 |
| Z | LONG | UP | 10 |
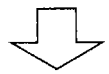
441  410H
| PORT | TYPE | LINK STATE | USAGE STATUS |
|---|---|---|---|
| V | SHORT | DOWN | 01 |
| W | RESERVE | DOWN | 00 |
| X | RESERVE | DOWN | 00 |
| Y | RESERVE | DOWN | 00 |
| Z | LONG | UP | 11 |
442
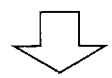
443  410I
| PORT | TYPE | LINK STATE | USAGE STATUS |
|---|---|---|---|
| V | SHORT | UP | 01 |
| W | RESERVE | DOWN | 00 |
| X | RESERVE | DOWN | 00 |
| Y | RESERVE | DOWN | 00 |
| Z | LONG | UP | 10 |
444

APPARATUS AND METHOD FOR FRAGMENTING TRANSMISSION DATA

CROSS-REFERENCE TO RELATED APPLICATION

This application is based upon and claims the benefit of priority of the prior Japanese Patent Application No. 2012-083171, filed on Mar. 30, 2012, the entire contents of which are incorporated herein by reference.

FIELD

The embodiments discussed herein relate to apparatus and method for fragmenting transmission data.

BACKGROUND

The amount of data flowing over networks has increased dramatically recently due to various network service enhancements. Accordingly, in order to promote the usage efficiency of network bandwidth, link aggregation (LAG), which is a technology for using a plurality of physical lines as one logical line, has been standardized as IEEE 802.3ad.

On the other hand, improvements in communication speeds and processing speeds have also advanced in data transmission devices. Data transmission devices are now able to quickly process large amounts of data due to these improvements. Data transmission devices are expected to accommodate long frames, which handle a large amount of data in one frame, in order to quickly process the huge amounts of data that flow through the networks. In particular, a frame that exceeds 9000 bytes is called a jumbo frame.

When short and long frames are used in one network, short frames are made to wait for processing while long frames that flow into the network are processed. As a result, processing of short frames is delayed and there is a risk that delay fluctuations may occur. For example, when the delay fluctuations occur, the arrival times of short frames at a computer that processes short frames may become varied and it is conceivable that the reception order of the short frames may be changed in the computer. The computer that receives the short frames may not be able to perform processing accurately when the order of the received short frames is changed in this way. For example, IP telephone is a service that uses short frames and requires minimal delays. Thus, when a service such as IP telephone and a service that uses jumbo frames co-exist in one network, there is a possibility that delay fluctuations of IP telephone frames may occur due to the jumbo frames. In this case, the IP telephone service may become delayed.

Japanese Laid-open Patent Publication No. 2005-303516 discusses, as a technology for these types of long frames, a technology for performing fragmentation by fragmenting long frames into a certain size at the transmission source and rebuilding the long frames at the receiving side. Moreover, Japanese Laid-open Patent Publication No. 9-312668 discusses a technology for configuring a LAG and sorting output packets to physical lines that configure the LAG in accordance with the packet sizes, so as to increase the ratio of reading short packets.

SUMMARY

According to an aspect of the invention, there is provided an apparatus for fragmenting transmission data. The apparatus includes first, second, and spare ports, where first data having a data length less than a predetermined value is transmitted from the first port and second data having a data length not less than the predetermined value is transmitted from the second port. The apparatus obtains a first determination result indicating whether input data is the first data or the second data and a second determination result indicating whether a transmission rate of each of the first and second ports is equal to or greater than a threshold. The apparatus sorts the input data to one of the first, second, and spare ports, based on the first and second determination results. The apparatus fragments the second data and transmit the fragmented second data to the spare port when both the first data and the second data are sorted to the spare port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of a LAG port table, according to a second embodiment;

FIG. 15 is a diagram illustrating an example of transition of a LAG sorting table when a link state of an unused spare port is changed, according to an embodiment;

FIG. 16 is a diagram illustrating an example of transition of a LAG sorting table when a link state of a used spare port is changed and an unused spare port remains, according to an embodiment;

FIG. 17 is a diagram illustrating an example of transition of a LAG sorting table when a link state of a used spare port is changed and no sortable spare port remains, according to an embodiment;

DESCRIPTION OF EMBODIMENTS

In the conventional technology of fragmenting the long frames, overhead increases due to the addition of information in each fragmented frame and due to an increase in a gap between frames. As a result, the traffic rate increases, excessive bandwidth is consumed, and data processing is delayed. Moreover, in the conventional technology for sorting the frames to a LAG according to the packet size, short frames and long frames may be mixed together and delay fluctuations may occur for the short frames.

The embodiments discussed herein describe in detail a data transmission device, a data transmission system, and a data transmission method with reference to the drawings. The data transmission device, the data transmission system, and the data transmission method are not limited to following embodiments.

(Embodiment 1)

Figure 1:
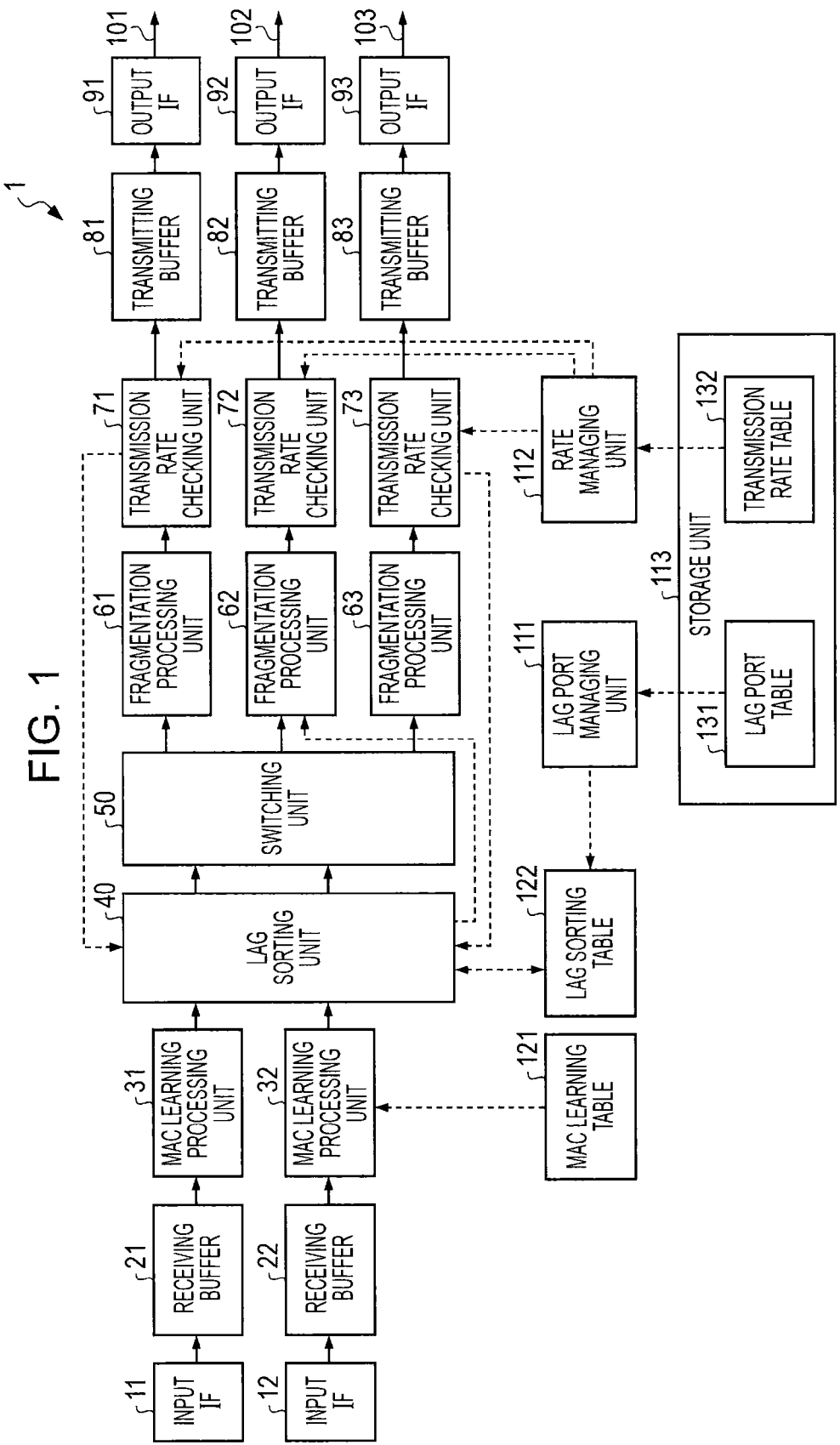
FIG. 1 is a diagram illustrating a configuration example of a data transmission device, according to a first embodiment.

FIG. 1 is a block diagram illustrating a configuration example of a data transmission device, according to a first embodiment. As illustrated in FIG. 1, a data transmission device 1 according to the first embodiment includes input interfaces (IFs) 11 and 12, receiving buffers 21 and 22, and media access control (MAC) learning processing units 31 and 32. The data transmission device 1 further includes a LAG sorting unit 40, a switching unit 50, fragmentation processing units 61 to 63, transmission rate checking units 71 to 73, transmitting buffers 81 to 83, output IFs 91 to 93, and lines 101 to 103. The data transmission device 1 further includes a LAG port managing unit 111, a rate managing unit 112, a storage unit 113, a MAC learning table 121, and a LAG sorting table 122. The following is an explanation of the data transmission device 1 as a device that transmits and receives data in frame units. A frame of data that is transmitted and received by the data transmission device 1 will be also simply referred to as a "frame" in the following description. Moreover, a solid line arrow in FIG. 1 indicates the flow of frames and a dotted line arrow indicates the flow of control information.

The output IFs 91 to 93 are transmitting ports respectively connected to the lines 101 to 103. In the present embodiment, the data transmission device 1 is assumed to have only three transmitting ports that are the output IFs 91 to 93, for ease of explanation. The output IFs 91 to 93 and the lines 101 to 103 are configured as one logical line. Hereinbelow, one logical line configured by putting together a plurality of transmitting ports will be referred to as a "LAG." However, the number of ports and the number of LAGs, of the data transmission device 1, are not limited, and, furthermore, there may exist a transmitting port that does not constitute a LAG. In the following description, the output IFs 91 to 93 will be also referred to as simply "ports."

The storage unit 113 stores the LAG port table 131 and the transmission rate table 132.

In the configuration example of FIG. 1, any one or more components (units) may be implemented using a hardware processor, such as a CPU, by causing the hardware processor to execute one or more program codes stored in a memory.

Figure 2:
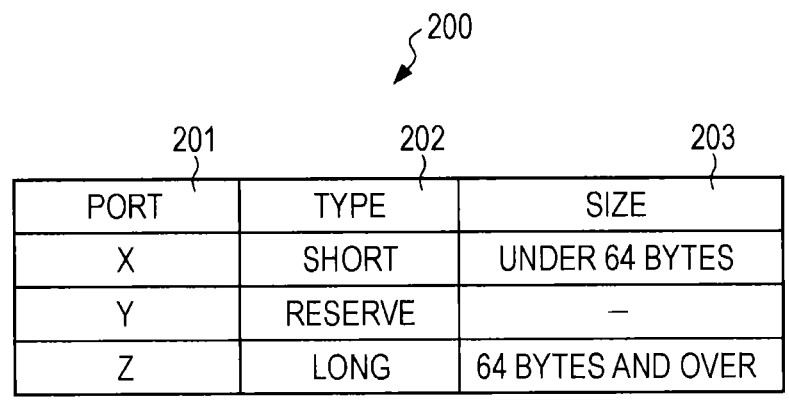
FIG. 2 is a diagram illustrating an example of a link aggregation (LAG) port table, according to an embodiment.

The LAG port table 131 is a table stored in a memory as information used for processing. The LAG port table 131 stores a usage type of port or information identifying the usage type, in association with each port, as illustrated, for example, in a table 200 in FIG. 2. FIG. 2 is an example of a LAG port table.

Herein follows a detailed explanation of the table 200. The column 201 indicates port identification information. The column 202 indicates a usage type of the corresponding port where the usage type identifies a type of frames that are transmitted from the corresponding port. In the present embodiment, the frame types include a short frame type and a long frame type. In the table 200, "SHORT" indicates that the corresponding port is used for transmitting short frames (hereinafter will be also referred to as a "short frame port"). In the table 200, "LONG" indicates that the corresponding port is used for transmitting long frames (hereinafter will be also referred to as a "long frame port"). Hereinbelow, a short frame port and a long frame port will be also referred to collectively as a "normal port." Moreover, "RESERVE" indicates that the corresponding port is a spare port for which a type of frames to be transmitted is not determined. In the example of the first embodiment, out of three lines, two lines are used for the short frame port and the long frame port, respectively, and the remaining line is used for the spare port. The column 203 is information for indicating the definitions of short frames and long frames. Namely, a short frame in the embodiment is defined as a frame whose size is under 64 bytes. A frame whose size is 64 bytes or more is defined as a long frame. The information in the LAG port table 131 is set beforehand. However, an operator is able to appropriately set the usage type of each port, and is able to set appropriate values as the definitions of the short frames and the long frames.

In this case, a port X indicates the output IF 91. A port Y indicates the output IF 92. A port Z indicates the output IF 93. The output IF 91 is set as a short frame port. The output IF 92 is set as a spare port. The output IF 93 is set as a long frame port.

Figure 3:
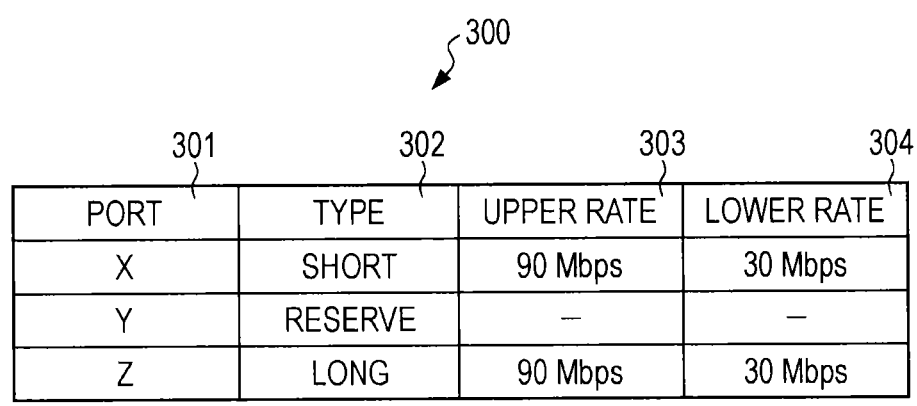
FIG. 3 is a diagram illustrating an example of a transmission rate table, according to an embodiment.

The transmission rate table 132 is a table stored in a memory as information used for processing. For example, the transmission rate table 132 stores a usage type, and information indicating an upper limit and a lower limit of the transmission rate, in association with each port, as illustrated in a table 300 in FIG. 3. FIG. 3 is an example of a transmission rate table.

Herein follows a detailed explanation of the table 300. The column 301 indicates port identification information. The column 302 indicates the usage type of each port. The column 303 indicates an upper limit of the transmission rate for each port. The column 304 indicates a lower limit of the transmission rate for each port. The information in the transmission rate table 132 is set beforehand. However, the operator is able to appropriately set the upper limit and the lower limit of the transmission rate for each port.

When a LAG is set, the firmware is activated, or the setting values are changed by the operator, the LAG port managing unit 111 reads out setting values from the LAG port table 131 and sets the read values in the LAG sorting table 122.

Figure 4:
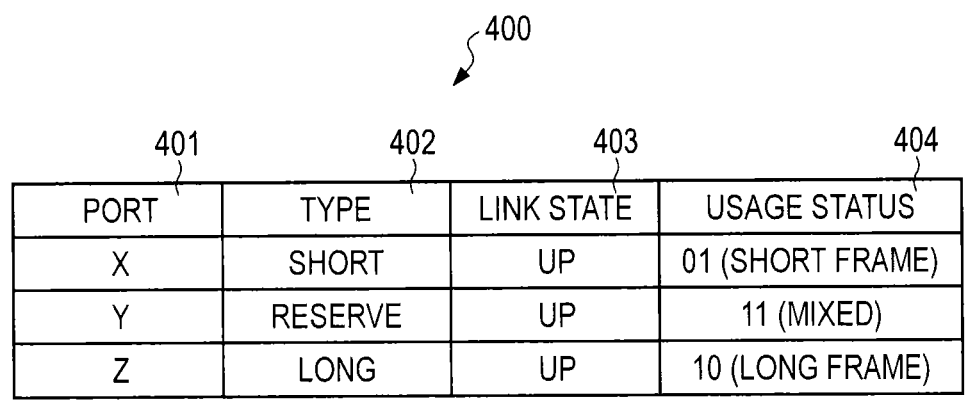
FIG. 4 is a diagram illustrating an example of a LAG sorting table, according to an embodiment.

The LAG sorting table 122 is a table implemented, for example, using hardware. The LAG sorting table 122 stores, in association with each port, a usage type, a link state, and a usage status, as illustrated in a table 400 in FIG. 4. FIG. 4 is an example of a LAG sorting table.

Herein follows a detailed explanation of the table 400. The column 401 indicates port identification information. The column 402 indicates the usage type of each port. The column 403 indicates a link state for each port. Here, the link state indicates whether a connection with an opposing device is established and is in a link-up state, where the link-up state indicates a state in which the each port is able to communicate with the opposing device. "UP" in the column 403 indicates a link-up state and "DOWN" indicates a link-down state, where the link-down state indicates a state in which the each port is unable to communicate with the opposing device. The column 404 indicates a usage status for each port, where the usage status indicates the types of frames actually flowing through the each port. For example, the usage status is represented using two bits where the lower-order bit is referred to as a first bit and the higher-order bit is referred to as a second bit in the following description. When short frames are flowing through a port, a usage status for the port is represented by setting the first bit at "ON", or "1", and when long frames are flowing through a port, a usage status for the port is represented by setting the second bit at "ON", or "1". That is, usage status "01" indicates that only short frames are flowing through the port, usage status "10" indicates that only long frames are flowing through the port, and usage status "11" indicates that short frames and long frames are mixed together and flowing through the port (hereinafter will be also referred to as "frame mixing"). Usage status "00" indicates that the port is not used for transmitting data. In FIG. 4, the type of frames flowing through each port is represented in parentheses following after the bit values indicating the usage status, for ease of understanding ("mixed" indicates frame mixing).

Figure 5:
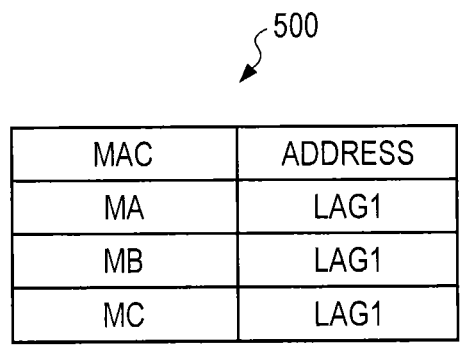
FIG. 5 is a diagram illustrating an example of a media access control (MAC) learning table, according to an embodiment.

The MAC learning table 121 is a table, for example, implemented using hardware. The MAC learning table 121 stores, for example, information on a transmitting port or a logical group of transmitting ports, in association with a MAC address, as illustrated in a table 500 of FIG. 5. FIG. 5 illustrates an example of a MAC learning table. For example, MAC addresses "MA," "MB," and "MC" are associated with a LAG identified by "LAG 1" in the table 500. Although only one LAG, that is, LAG 1, is set in table 500 as illustrated in FIG. 5, a MAC address may be associated with another LAG or may be directly associated with a transmitting port.

The rate managing unit 112 reads out, from the transmission rate table 132, the upper and lower limits of the transmission rate corresponding to each port. The rate managing unit 112 sets the read upper and lower limits to the transmission rate checking unit associated with each port. Here, since a transmission rate is only set for a normal port, the rate managing unit 112 sets the upper and lower limits only to the transmission rate checking units 71 and 73.

The input IFs 11 and 12 are interfaces for receiving frames transmitted from external devices. In the embodiment, for example, the input IF 11 is connected to the network having virtual local area network (VLAN) ID "10". The input IF 12 is connected to the network having VLAN-ID of "20".

Devices having the MAC addresses "MA" and "MB" are connected to the network having the VLAN-ID "10". A device having the MAC address "MC" is connected to the network having the VLAN-ID "20". The input IF 11 receives frames from the network having the VLAN-ID "10". The input IF 12 receives frames from the network having VLAN-ID "20".

The receiving buffer 21 acquires and stores the frames received by the input IF 11. The receiving buffer 22 acquires and stores the frames received by the input IF 12.

The MAC learning processing unit 31 reads, in order, the frames stored in the receiving buffer 21. The MAC learning processing unit 31 obtains the destination MAC address from the read frame. The MAC learning processing unit 31 then obtains the port number corresponding to the obtained MAC address by referring to the MAC learning table 121, and determines that a port having the obtained port number is the frame destination. When the destination corresponding to the MAC address in the MAC learning table 121 is a LAG, the MAC learning processing unit 31 obtains information on the LAG. For example, when the MAC address of the frame destination is "MA", the MAC learning processing unit 31 obtains address information on the LAG 1 from the table 500 (see FIG. 5). The MAC learning processing unit 31 then determines that the frame destination is the LAG 1. The MAC learning processing unit 31 outputs the read frames to the LAG sorting unit 40 along with information on the frame destination.

The MAC learning processing unit 32 reads, in order, the frames stored in the receiving buffer 22. The MAC learning processing unit 32 determines the frame destination in the same way as the MAC learning processing unit 32, and outputs the read frames to the LAG sorting unit 40 along with information on the frame destination.

The LAG sorting unit 40 receives the frames and the frame destination information from the MAC learning processing units 31 and 32. When the frame destination is a LAG, the LAG sorting unit 40 obtains size information from the received frames. The LAG sorting unit 40 uses the size information of the received frames to obtain, from the LAG sorting table 122, port information identifying ports that become the output destinations of the received frames. For example, when the sizes of received frame is less than 64 bytes, the LAG sorting unit 40 determines that the received frame is a short frame, selects one or more ports for transmitting short frames by referring to the usage statuses of the LAG sorting table 122, and determines the selected ports as the output destination of the received frame. For example, when the size of received frame is 64 bytes or greater, the LAG sorting unit 40 determines that the received frame is a long frame, selects one or more ports for transmitting long frames by referring to the usage statuses of the LAG sorting table 122, and determines the selected ports as the output destination of the received frame.

When only one port has been determined as the output destination of the received frame, the LAG sorting unit 40 sends, to the switching unit 50, the received frame together with an instruction for transferring the received frame to the determined output-destination port. When two or more ports have been determined as the output destination of the received frame, the LAG sorting unit 40 selects an output-destination port from among the determined two or more ports so that the selected output-destination port for transmitting frames whose type is the same as that of the received frame is periodically switched among the determined two or more ports, and sends, to the switching unit 50, the received frame together with an instruction for transferring the received frame to the selected output-destination port. For example, in the embodiment, when the output IF 91 and the output IF 92 are transmitting short frames, the LAG sorting unit 40 selects an output-destination port for the received frames so that short frames are transmitted alternately from the output IF 91 and the output IF 92.

Further, when the transmission rate of the output IF 91 or 93 exceeds the upper limit, the LAG sorting unit 40 receives, from the transmission rate checking unit 71 or 73 associated with the port for which the transmission rate has exceeded, a report indicating that the transmission rate has exceeded the upper limit. Hereinbelow, a type of frames transmitted from a port for which the transmission rate has exceeded the upper limit is referred to as an "upper limit exceeding type."

Upon receiving the report indicating that the transmission rate has exceeded the upper limit, the LAG sorting unit 40 determines whether the output IF 92 serving as a spare port is in a link-up state, based on the LAG sorting table 122 (for example, see FIG. 4).

When the output IF 92 is in a link-up state, the LAG sorting unit 40 determines to sort the upper limit exceeding type of frames to the output IF 92 serving as the spare port. The LAG sorting unit 40 then changes, in the LAG sorting table 122, the value of the usage status for a port corresponding to the transmission of upper limit exceeding frames. For example, when the transmission rate of the output IF 91 serving as a port for transmitting short frames exceeds the upper limit, the LAG sorting unit 40 receives, from the transmission rate checking unit 71, a report indicating that the transmission rate has exceeded the upper limit. The LAG sorting unit 40 then sets the corresponding one of the bits indicating the usage status of the output IF 92 in the LAG sorting table 122, at "ON" or "1" meaning the transmission of short frames. For example, when the output IF 92 serving as the spare port is not being used and the value of the bits indicating the usage status is "00," the LAG sorting unit 40 changes the value of the bits indicating the usage status of the output IF 92 from "00" to "01" when short frames are to be transmitted. Moreover, when the output IF 92 serving as the spare port is already transmitting long frames and the value of the bits indicating the usage status is "10", the LAG sorting unit 40 changes the value of the bits indicating the usage status of the output IF 92 from "10" to "11" when short frames are to be transmitted.

Further, when frames are sorted to a spare port, the LAG sorting unit 40 checks the usage status of the spare port in the LAG sorting table 122 and determines that the types of frames are mixed when the value of the bits indicating the usage status is "11." The LAG sorting unit 40 then instructs the fragmentation processing unit 62 to set fragmentation when the usage status is frame mixing.

The LAG sorting unit 40 does not extend sorting destinations when there exists a port having the usage status of a "frame mixing".

When the output IF 92 serving as the spare port is in a link-down state, the LAG sorting unit 40 determines whether there exists a port that is in a link-up sate and has a usage type opposite to the upper limit exceeding type, by referring to the LAG sorting table 122. When there exists the port that is in a link-up state and has a usage type opposite to the upper limit exceeding type, the LAG sorting unit 40 determines the port as an alternative port, and sorts the upper limit exceeding frames to the alternative port having a usage type opposite to the upper limit exceeding type. The LAG sorting unit 40 then changes the usage status of the alternative port so that upper limit exceeding frames are transmitted from the alternative port. For example, a case will be described in which the transmission rate of the output IF 91 serving as a port for transmitting short frames exceeds the upper limit. In this case, when the output IF 92 is in a link-down state, the LAG sorting unit 40 sets the corresponding one (the second bit) of the bits indicating the usage status of the output IF 93 in the LAG sorting table 122, at ON value meaning the transmission of short frames. For example, the value of the bits indicating the usage status of the output IF 93 in the LAG sorting table 122 is changed from "10" to "11."

Meanwhile, when there exists no port that is in a link-up sate and has a usage type opposite to the upper limit exceeding type, the LAG sorting unit 40 does not perform frame sorting.

When the transmission rate of the output IF 91 or 93 falls below the lower limit, the LAG sorting unit 40 receives, from the transmission rate checking unit 71 or 73 associated with a port for which the transmission rate has fallen below the lower limit, a report indicating that the transmission rate has fallen below the lower limit. Hereinafter, a type of frames transmitted from a port for which the transmission rate has fallen below the lower limit is referred to as "lower limit exceeding type".

Upon receiving the report indicating that the transmission rate has fallen below the lower limit, the LAG sorting unit 40 uses the LAG sorting table 122 to determine whether the output IF 92 serving as the spare port is transmitting a lower limit exceeding type of frames. Hereinafter, "lower limit exceeding type of frames" will be also expresses as "lower limit exceeding frames", for ease of explanation. When the output IF 92 serving as the spare port is transmitting lower limit exceeding frames, the LAG sorting unit 40 determines to stop the transmission of the lower limit exceeding frames from the output IF 92. The LAG sorting unit 40 then changes, in the LAG sorting table 122, the usage status of the port associated with the output IF 92 so that lower limit exceeding frames are not transmitted. For example, when the transmission rate of the output IF 91 serving as a port for transmitting short frames falls below the lower limit, the LAG sorting unit 40 receives, from the transmission rate checking unit 71, a report indicating that the transmission rate has fallen below the lower limit. The LAG sorting unit 40 then drops the bit, in the usage status of the output IF 92 in the LAG sorting table 122, indicating the transmission of short frames. For example, when the output IF 92 serving as the spare port transmits only short frames and the value of the bits indicating the usage status is "01", the LAG sorting unit 40 changes the value of the bits indicating the usage status of the output IF 92 "01" to "00" when the transmission of short frames is to be stopped. Moreover, when the output IF 92 serving as the spare port is transmitting mixed frames and the value of the bits indicating the usage status is "11", the LAG sorting unit 40 changes the value of the bits indicating the usage status of the output IF 92 from "11" to "10" when the transmission of short frames is to be stopped.

Further, upon determining to stop frame sorting to the output IF 92 that serves as a spare port and is in a frame mixing status, the LAG sorting unit 40 instructs the fragmentation processing unit 62 to stop fragmentation processing.

When the output IF 92 is in a link-down state, the LAG sorting unit 40 determines, based on the LAG sorting table 122, whether there is a port that has a usage type opposite to the lower limit exceeding type and is in a usage status of frame mixing. When the port having a usage type opposite to the lower limit exceeding type and transmitting mixed frames, the LAG sorting unit 40 changes the usage status of the port having a usage type opposite to the lower limit exceeding type so that lower limit exceeding frames are not transmitted. For example, a case will be described in which the transmission rate of the output IF 91 serving as a port for transmitting short frames falls below the lower limit. In this case, when the usage status of the output IF 93 serving as the long frame port is frame mixing, the LAG sorting unit 40 drops the bit (the second bit), in the usage status of the output IF 93 in the LAG sorting table 122, indicating the transmission of short frames. For example, the value of the bits indicating the usage status of the output IF 93 in the LAG sorting table 122 is changed from "11" to "10."

The switching unit 50 receives, from the LAG sorting unit 40, a frame together with information on the output destination port of the received frame. The switching unit 50 outputs the received frame to one of the fragmentation processing units 61 to 63 that is associated with the output destination port.

In each of the fragmentation processing units 61 to 63, fragmentation processing is disabled until a fragmentation setting instruction is received from the LAG sorting unit 40. In this state, the fragmentation processing units 61 to 63 output the frames received from the switching unit 50 to the corresponding transmission rate checking units 71 to 73, respectively, without performing the fragmentation processing.

Upon receiving a fragmentation setting instruction from the LAG sorting unit 40, each of the fragmentation processing units 61 to 63 starts fragmentation processing on long frames. The fragmentation processing units 61 to 63 each output short frames, out of the received frames, to the corresponding one of transmission rate checking units 71 to 73. Moreover, the fragmentation processing units 61 to 63 each perform fragmentation processing on long frames, out of the received frames, by break up the long frames into fragments (fragmented frames). The fragmentation processing units 61 to 63 each output the fragmented frames to the corresponding one of the transmission rate checking units 71 to 73.

Upon receiving instructions for stopping fragmentation processing from the LAG sorting unit 40, the fragmentation processing units 61 to 63 each stop the fragmentation processing, and output the frames received from the switching unit 50 to the corresponding one of the transmission rate checking units 71 to 73 without performing the fragmentation processing.

The transmission rate checking units 71 to 73 receive, from the rate managing unit 112, setting information including the upper limit of a transmission rate and the lower limit of a transmission rate. In the present embodiment, the transmission rate checking units 71 and 73 each receive, from the rate managing unit 112, setting information including the upper and lower limits of the transmission rate, and set the received setting information.

The transmission rate checking units 71 to 73 receive frames from the fragmentation processing units 61 to 63, respectively. In the case, the transmission rate checking unit 72 outputs frames to the transmitting buffer 82 without checking the transmission rate since the setting information including the upper and lower limits is not received. Meanwhile, the transmission rate checking units 71 and 73 each check whether the transmission rate for the corresponding port is above the upper limit or below the lower limit. When the transmission rate is above the upper limit, the transmission rate checking units 71 and 73 each report the fact that the transmission rate exceeds the upper limit, to the LAG sorting unit 40. When the transmission rate is below the lower limit, the transmission rate checking units 71 and 73 each report the fact that the transmission rate is below the lower limit, to the LAG sorting unit 40.

The transmitting buffers 81 to 83 receive frames from the transmission rate checking units 71 to 73, respectively. The transmitting buffers 81 to 83 each store the received frames. The stored frames are read out, in order, by each of the transmitting buffers 81 to 83, and output to the corresponding port.

Figure 6:
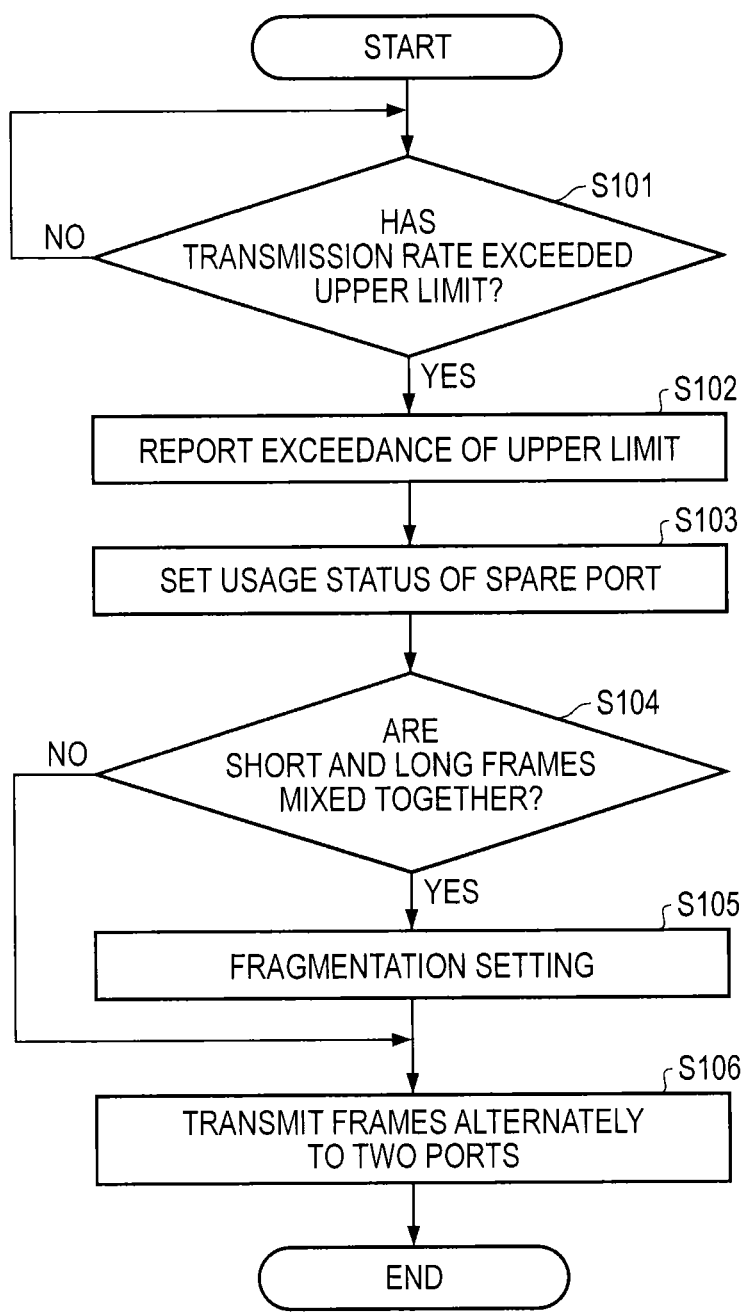
FIG. 6 is a diagram illustrating an example of a flow chart of processing performed when a transmission rate exceeds an upper limit in a data transmission device, according to a first embodiment.

Processing when a transmission rate exceeds an upper limit in the data transmission device 1 according to the first embodiment will be explained with reference to FIG. 6. FIG. 6 illustrates a flowchart of processing performed when a transmission rate exceeds an upper limit in the data transmission device 1 according to the first embodiment. In the following explanation, it is assumed that the output IFs 91 to 92 are in a link-up state.

The transmission rate checking units 71 or 73 detects whether the transmission rate is above the upper limit (step S101). When the upper limit is not exceeded (step S101: NO), the transmission rate checking unit 71 or 73 continues to perform detecting.

When an exceedance of the upper limit is detected (step S101: YES), the transmission rate checking unit 71 or 73 reports the exceedance of the upper limit to the LAG sorting unit 40 (step S102).

The LAG sorting unit 40 confirms that the output IF 92 serving as the spare port is in a link-up state, and sets the usage status of the spare port in the LAG sorting table 122 so that upper limit exceeding frames are transmitted from the output IF 92 (step S103).

The LAG sorting unit 40 determines whether the usage status of the output IF 92 serving as the spare port is frame mixing or not, by referring to the usage status of the spare port in the LAG sorting table 122 (step S104).

When the usage status indicates frame mixing (step S104: YES), the LAG sorting unit 40 then sets fragmentation to the fragmentation processing unit 62 to perform fragmentation processing (step S105). Conversely, when the usage status does not indicate frame mixing (step S104: NO), the processing of the LAG sorting unit 40 proceeds to step S106.

Next, the LAG sorting unit 40 transmits frames alternately to the port (the output IF 91 or IF 93) whose transmission rate has exceeded the upper limit and to the spare port (the output IF 92) (step S106).

Figure 7:
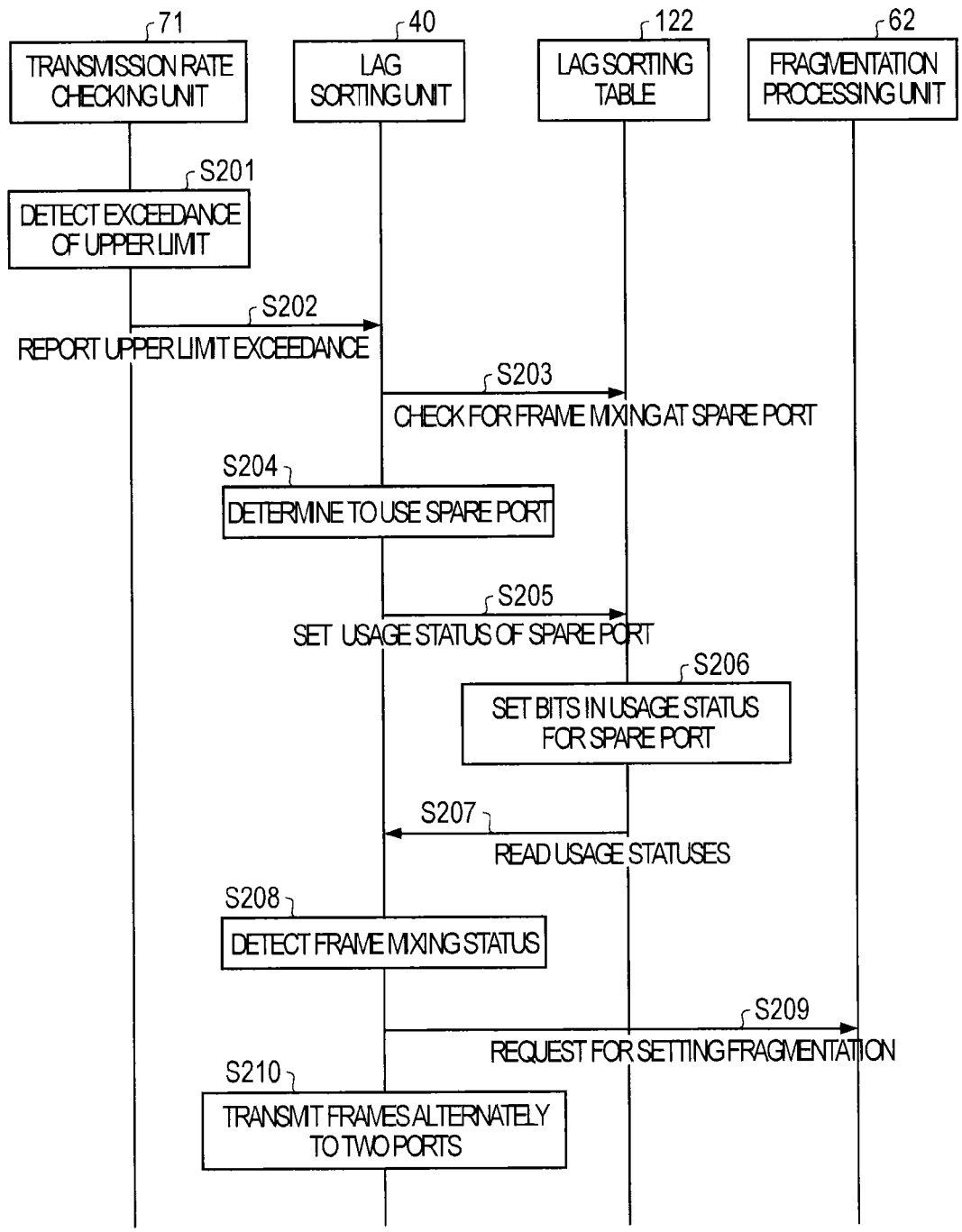
FIG. 7 is a diagram illustrating an example of an operational sequence performed when a transmission rate exceeds an upper limit in a data transmission device, according to a first embodiment.

Processing performed when a transmission rate exceeds an upper limit in the data transmission device 1 according to the first embodiment will be further explained with reference to FIG. 7. FIG. 7 is a sequence diagram of processing performed when a transmission rate exceeds an upper limit in a data transmission device 1 according to the first embodiment. In the following explanation, it is assumed that the output IFs 91 to 93 are in a link-up state. For example, a case will be described in which the transmission rate of the output IF 91 serving as a port for transmitting short frames exceeds an upper limit.

The transmission rate checking unit 71 detects that the transmission rate in the output IF 91 exceeds the upper limit (step S201). The transmission rate checking unit 71 reports the upper limit exceedance to the LAG sorting unit 40 (step S202).

The LAG sorting unit 40 confirms whether the output of the output IF 92 serving as a spare port is frame mixing (step S203). It is assumed that the output of the output IF 92 is not frame mixing in the following explanation.

The LAG sorting unit 40 determines to use the spare port to transmit short frames (step S204).

The LAG sorting unit 40 then sets the bit indicating the transmission of short frames at "ON", in the usage status of the spare port in the LAG sorting table 122 (step S206).

The LAG sorting unit 40 reads the usage status of the output IF 92 serving as the spare port, from the LAG sorting table 122 (step S207).

The LAG sorting unit 40 then detects whether frame mixing is occurring from the read usage status. It is assumed that the output of the output IF 92 is frame mixing in the following explanation. Therefore, the LAG sorting unit 40 detects frame mixing (step S208).

The LAG sorting unit 40 instructs the fragmentation processing unit 62 to perform fragmentation processing (step S209). The fragmentation processing unit 62 starts fragmentation processing on long frames.

The LAG sorting unit 40 transmits short frames alternately to the output IF 91 serving as a port for transmitting short frames and to the output IF 92 serving as the spare port (step S210).

Figure 8:
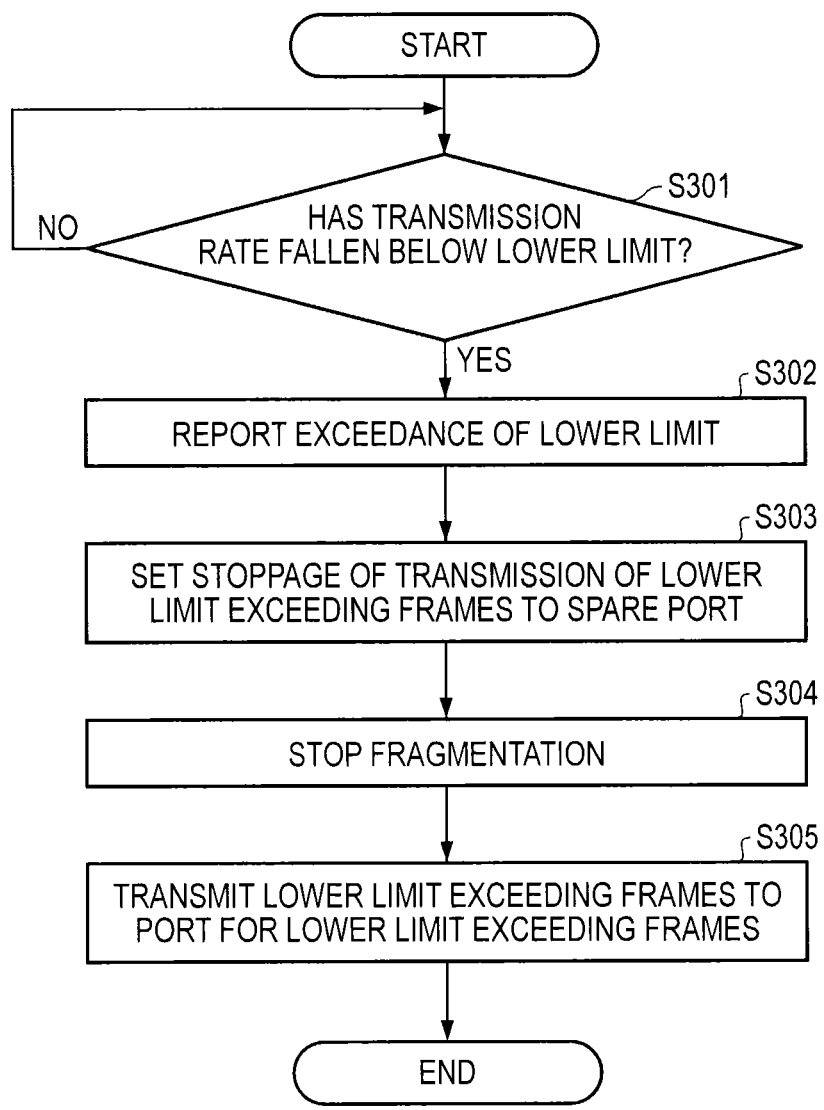
FIG. 8 is a diagram illustrating an example of a flow chart of processing performed when a transmission rate falls below a lower limit in the data transmission device according to a first embodiment.

Processing performed when a transmission rate falls below the lower limit in the data transmission device 1 according to the first embodiment will be explained with reference to FIG. 8. FIG. 8 is a flowchart of processing performed when a transmission rate falls below a lower limit in the data transmission device 1 according to the first embodiment. It is assumed that the output IFs 91 to 92 are in a link-up state in the following explanation. It is also assumed that the lower limit exceeding frames are sorted to the spare port in the following explanation.

The transmission rate checking unit 71 or 73 detects whether the transmission rate is below the lower limit (step S301). When the transmission rate is not below the lower limit (step S301: NO), the transmission rate checking unit 71 or 73 continues to perform detecting.

When the transmission rate is below the lower limit (step S301: YES), the transmission rate checking unit 71 or 73 reports the lower limit exceedance to the LAG sorting unit 40 (step S302).

The LAG sorting unit 40 confirms that the lower limit exceeding frames are sorted to the output IF 92 serving as the spare port and sets the usage status of the spare port in the LAG sorting table 122 so that the transmission of lower limit exceeding frames to the spare port is stopped (step S303).

The LAG sorting unit 40 then instructs the fragmentation processing unit 62 to stop fragmentation processing (step S304).

Next, the LAG sorting unit 40 transmits the lower limit exceeding frames to the port for which the exceedance of the lower limit has been detected (step S305).

Figure 9:
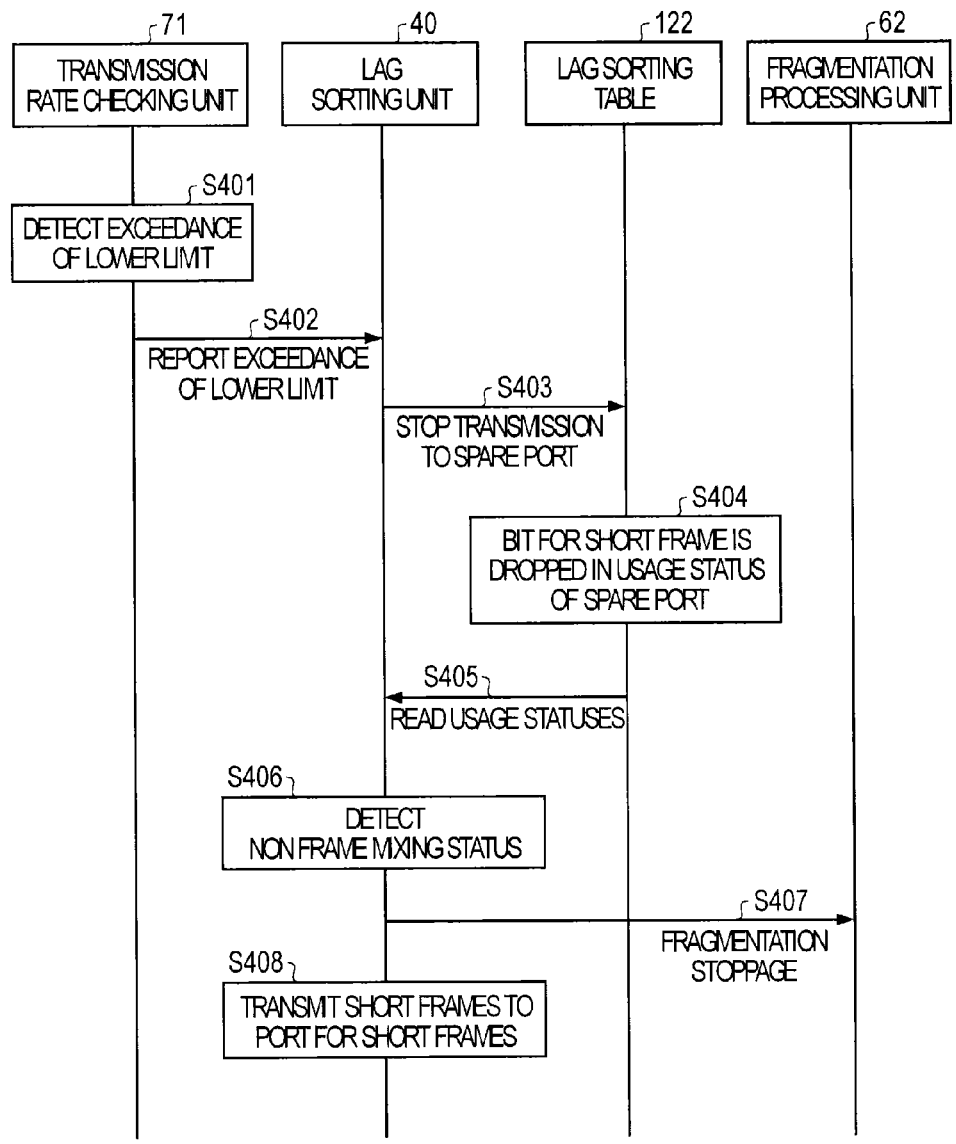
FIG. 9 is a diagram illustrating an example of an operational sequence performed when a transmission rate falls below a lower limit in a data transmission device, according to a first embodiment.

Processing performed when a transmission rate falls below the lower limit in the data transmission device 1 according to the first embodiment will be further explained with reference to FIG. 9. FIG. 9 is a sequence diagram of processing performed when a transmission rate falls below a lower limit in a data transmission device 1 according to the first embodiment. It is assumed that the output IFs 91 to 93 are in a link-up state in the following explanation. For example, a case will be described in which short frames are sorted to the output IF 92 serving as the spare port and the transmission rate of the output IF 91 serving as a port for transmitting short frames falls below the lower limit.

The transmission rate checking unit 71 detects that the transmission rate of the output IF 91 falls below the lower limit (step S401). The transmission rate checking unit 71 reports the lower limit exceedance to the LAG sorting unit 40 (step S402).

The LAG sorting unit 40 sets the LAG sorting table 122 so that transmission of short frames to the output IF 92 serving as the spare port is stopped (step S403).

In the usage status of the LAG sorting table 122, the bit indicating the transmission of short frames (short frame bit) is dropped (step S404).

The LAG sorting unit 40 then confirms the usage status in the LAG sorting table 122 of the output IF 92 serving as the spare port, by reading out the usage status from the LAG sorting table 122 (step S405).

The LAG sorting unit 40 then detects the usage status indicating that the output IF 92 serving as the spare port is not in a frame mixing status (step S406).

The LAG sorting unit 40 instructs the fragmentation processing unit 62 to stop fragmentation processing (step S407). The fragmentation processing unit 62 stops the fragmentation processing on long frames.

The LAG sorting unit 40 transmits short frames to the output IF 91 serving as a port for short frames (step S408). The LAG sorting unit 40 alternately sends long frames to the output IF 93 serving as a port for long frames and the output IF 92 serving as a spare port. The output IFs 92 and 93 then transmit the long frames which are not fragmented.

Figure 10:
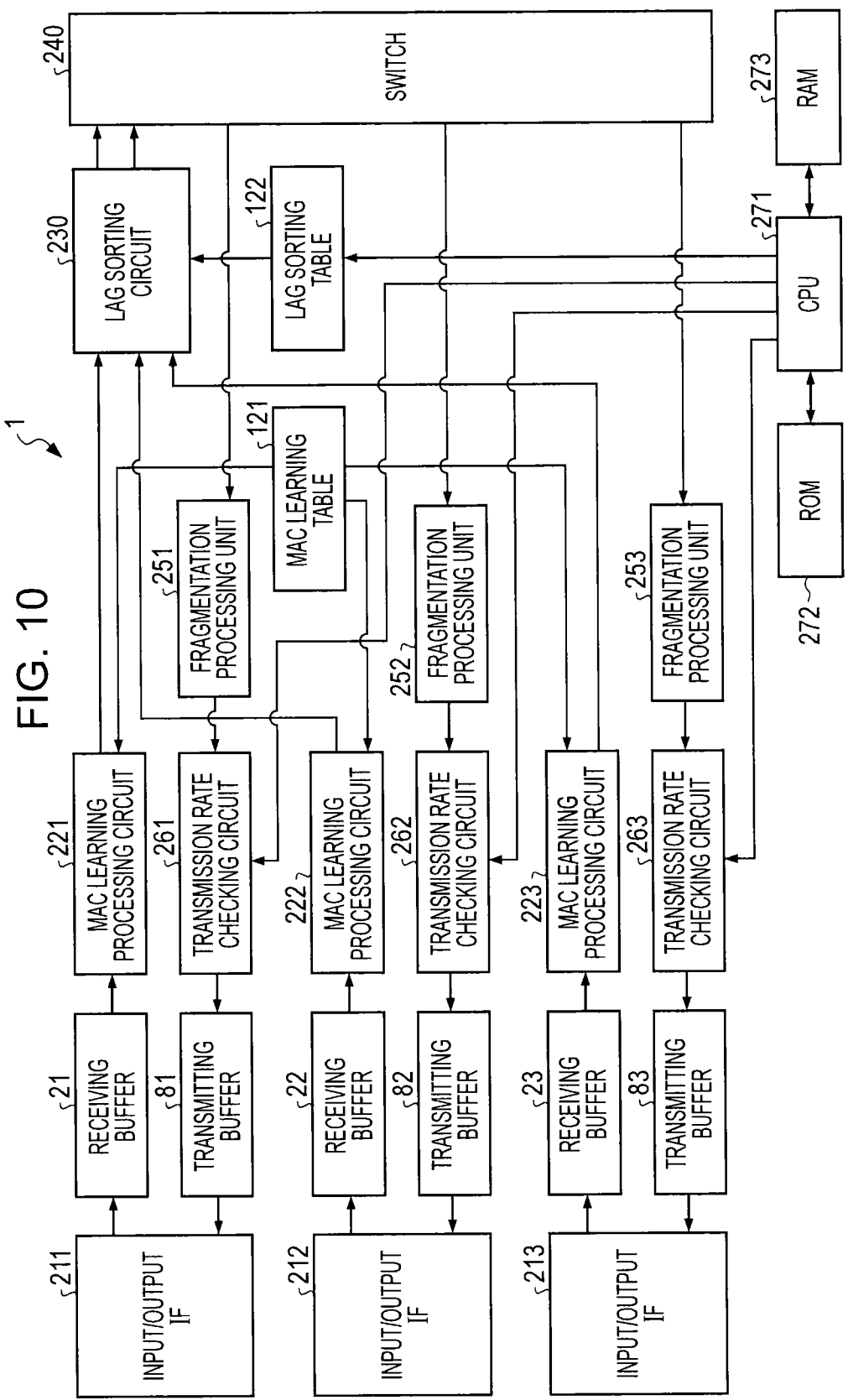
FIG. 10 is a diagram illustrating an example of a hardware configuration for implementing short frame transmission in a data transmission device, according to a first embodiment.

FIG. 10 is a diagram illustrating an example of a hardware configuration for implementing short frame transmission in the data transmission device 1 according to the first embodiment. Although FIG. 10 only illustrates hardware for transmitting short frames, in order to additionally implement the transmission of long frames in the data transmission device 1 as illustrated in FIG. 1, it is preferred that one more input/output path is added so that three output paths are provided.

The data transmission device 1 includes an input/output IF 211 that is one interface having the functions of the input IF 11 and the output IF 91, and further includes an input/output IF 212 that is one interface having the functions of the input IF 12 and the output IF 92. Moreover, an input/output IF 213 realizes the functions of the output IF 93.

MAC learning processing circuits 221 and 222 are circuits for realizing the functions of the MAC learning processing units 31 and 32. A LAG sorting circuit 230 is a circuit for realizing the functions of the LAG sorting unit 40. A switch 240 realizes the functions of the switching unit 50. Transmission rate checking circuits 261 to 263 are circuits for realizing the respective functions of the transmission rate checking units 71 to 73.

A CPU 271, a ROM 272, and a RAM 273, for example, realize the functions of the LAG port managing unit 111, the rate managing unit 112, and the storage unit 113. For example, the RAM 273 stores the LAG port table 131 and the transmission rate table 132. Moreover, the ROM 272 stores various programs and execution modules for realizing the functions of the LAG port managing unit 111 and the rate managing unit 112. The CPU 271 realizes the functions of the LAG port managing unit 111 and the rate managing unit 112 by executing the various programs stored in the ROM 272.

As described above, the data transmission device according to the embodiment performs fragmentation of long frames only when long frames and short frame are mixed. As a result, the data transmission device according to the embodiment is able to reduce the excessive consumption of bandwidth and suppress delay in transmission of short frames.

(Embodiment 2)

Figure 11:
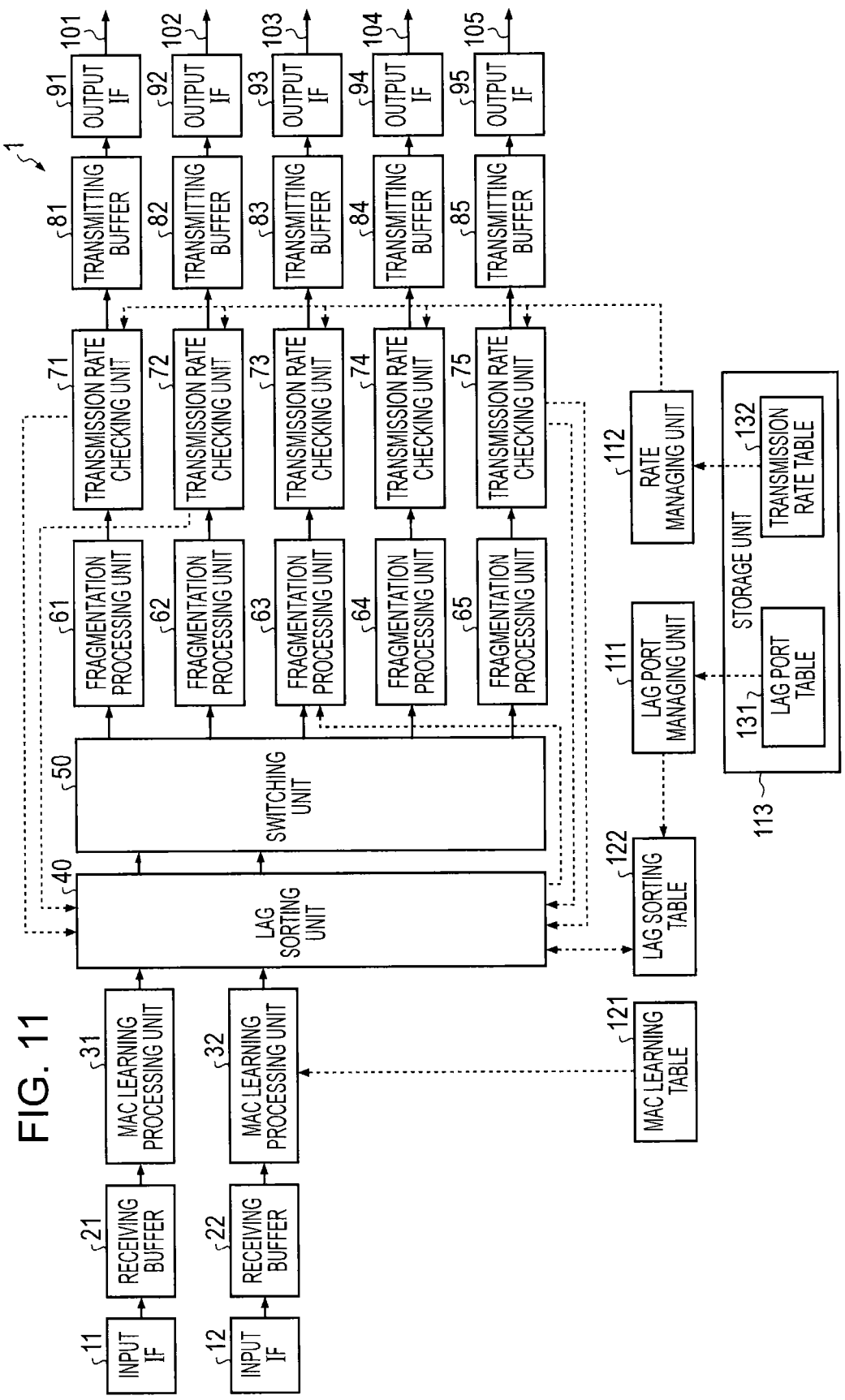
FIG. 11 is a diagram illustrating a configuration example of a data transmission device, according to a second embodiment.

The following is an explanation of a data transmission device according to a second embodiment. FIG. 11 is an example of a block diagram of a data transmission device according to a second embodiment. The data transmission device according to the second embodiment differs from the first embodiment in having a plurality of spare ports. Functions that are the same as the first embodiment are omitted in the following explanation. A case in which there are three spare ports is described as an example of the second embodiment; however the number of spare ports is not limited.

Since the data transmission device according to the second embodiment has a plurality of spare ports, there are a plurality of rows for spare ports in the LAG sorting table 122 as illustrated in a table 410 in FIG. 12. FIG. 12 is an example of a LAG port table according to the second embodiment.

A port V in the row 411 identifies the output IF 91 serving as a port for short frames, and a port Z in the row 415 identifies the output IF 95 serving as a port for long frames. Furthermore, a port W in the row 412, a port X in the row 413, and a port Y in the row 414 respectively identify the output IFs 92 to 94 serving as spare ports.

Upon receiving a report indicating an upper limit exceedance of a transmission rate from a transmission rate checking unit 71 or 75, the LAG sorting unit 40 selects one port, from among a plurality of spare ports, to which upper limit exceeding frames are to be sorted. In this example of the second embodiment, the LAG sorting unit 40 sorts short frames to the output IF 92 when the transmission rate of short frame exceeds the upper limit, and sorts long frames to the output IF 94 when the transmission rate of long frames exceeds the upper limit. The LAG sorting unit 40 then sets, in the LAG sorting table 122, the bit corresponding the type of sorted frames in the usage status of the spare port serving as the sorting destination, at "ON". Next, the LAG sorting unit 40 determines whether the usage status of the spare port of the sorting destination indicates frame mixing, by referring to the LAG sorting table 122. When the usage status of the sorting destination spare port indicates frame mixing, the LAG sorting unit 40 does not conduct further extension of the sorting destinations for both the short frames and the long frames. Conversely, when the usage status of the sorting destination spare port does not indicate frame mixing, the LAG sorting unit 40 continues extension of the sorting destinations.

After sorting frames to the spare port, when the transmission rate of the port having the upper limit exceeding type has exceeded the upper limit, the LAG sorting unit 40 further sorts frames having the same type as frames currently being sorted, to an unused spare port. For example, in a status in which the short frames are already being sorted to the output IF 92, the LAG sorting unit 40 receives a report of the upper limit exceedance from the transmission rate checking unit 71 when the transmission rate of the output IF 91 has exceeded the upper limit. The LAG sorting unit 40 then selects the output IF 93 identified by the port X, from among the unused spare ports, as a sorting destination. The LAG sorting unit 40 then sets, in the LAG sorting table 122, value "ON" is set to the bit corresponding to the type of sorted frames in the usage status of the spare port serving as the sorting destination.

Thereafter, when the transmission rate of the port having the upper limit exceeding type has further exceeded the upper limit, in the same way mentioned above, the LAG sorting unit 40 checks the usage status of the sorting destination spare port, and stops extension of the sorting destinations when the usage status indicates frame mixing, or continues extension of the sorting destination when the usage status indicates that there exists no frame mixing. In this way, the LAG sorting unit 40 performs extension of the sorting destination until all the spare ports are used and one of the spare ports enters a frame mixing status.

When there are a plurality of frame sorting destination ports, the LAG sorting unit 40 continues to sort frames, in order, to each of the plurality of frame sorting destination ports. For example, when short frames are to be sorted to the output IFs 91 to 93, the LAG sorting unit 40 repeatedly sorts the frames to the output IFs 91, 92, and 93 in that order.

Meanwhile, when the transmission rate of the output IF 91 serving as a port for short frames falls below the lower limit or when the transmission rate of the output IF 95 serving as a port for long frames falls below the lower limit, the LAG sorting unit 40 determines whether there exists a port having a usage status indicating frame mixing. When there exists a port having a usage status indicating frame mixing, the LAG sorting unit 40 stops sorting of the lower limit exceeding frames to the port having the usage status indicating frame mixing. Conversely, when there exists no port having the usage status indicating frame mixing, the LAG sorting unit 40 determines whether there exists a port transmitting lower limit exceeding frames. When there exists no port transmitting lower limit exceeding frames, the LAG sorting unit 40 does not retract sorting destinations. Conversely, when there exists a port transmitting lower limit exceeding frames, the LAG sorting unit 40 selects one port from among the ports transmitting lower limit exceeding frames, and stops sorting of lower limit exceeding frames to the selected port.

In the LAG sorting table 122, the LAG sorting unit 40 drops the bit corresponding to transmission of lower limit exceeding frames, in the usage status of the port for which the sorting of lower limit exceeding frames has been stopped. Thereafter, the LAG sorting unit 40 checks the usage status of the port for which the sorting of lower limit exceeding frames has been stopped, and, when the usage status does not indicate frame mixing, checks the status of one of the fragmentation processing units 62 to 64 corresponding to that port. When fragmentation is set to the corresponding one of the fragmentation processing units 62 to 64 for which the usage status has been checked, the LAG sorting unit 40 instructs the corresponding one of fragmentation processing units 62 to 64 to stop fragmentation processing. The LAG sorting unit 40 performs the abovementioned process for retracting sorting destinations until there exists no spare port left to which the lower limit exceeding frames are sorted.

When the transmission rate of the normal port falls below the lower limit and all the spare ports are unused, the LAG sorting unit 40 instructs the transmission rate checking unit 72 or 73 that has reported the lower limit exceedance, to stop reporting subsequent notifications of lower limit exceedance. When the transmission rate exceeds the upper limit in a port for which the reporting of the lower limit exceedance has been stopped, the LAG sorting unit 40 instructs the corresponding transmission rate checking unit to restart reporting a notification of the lower limit exceedance.

Figure 13:
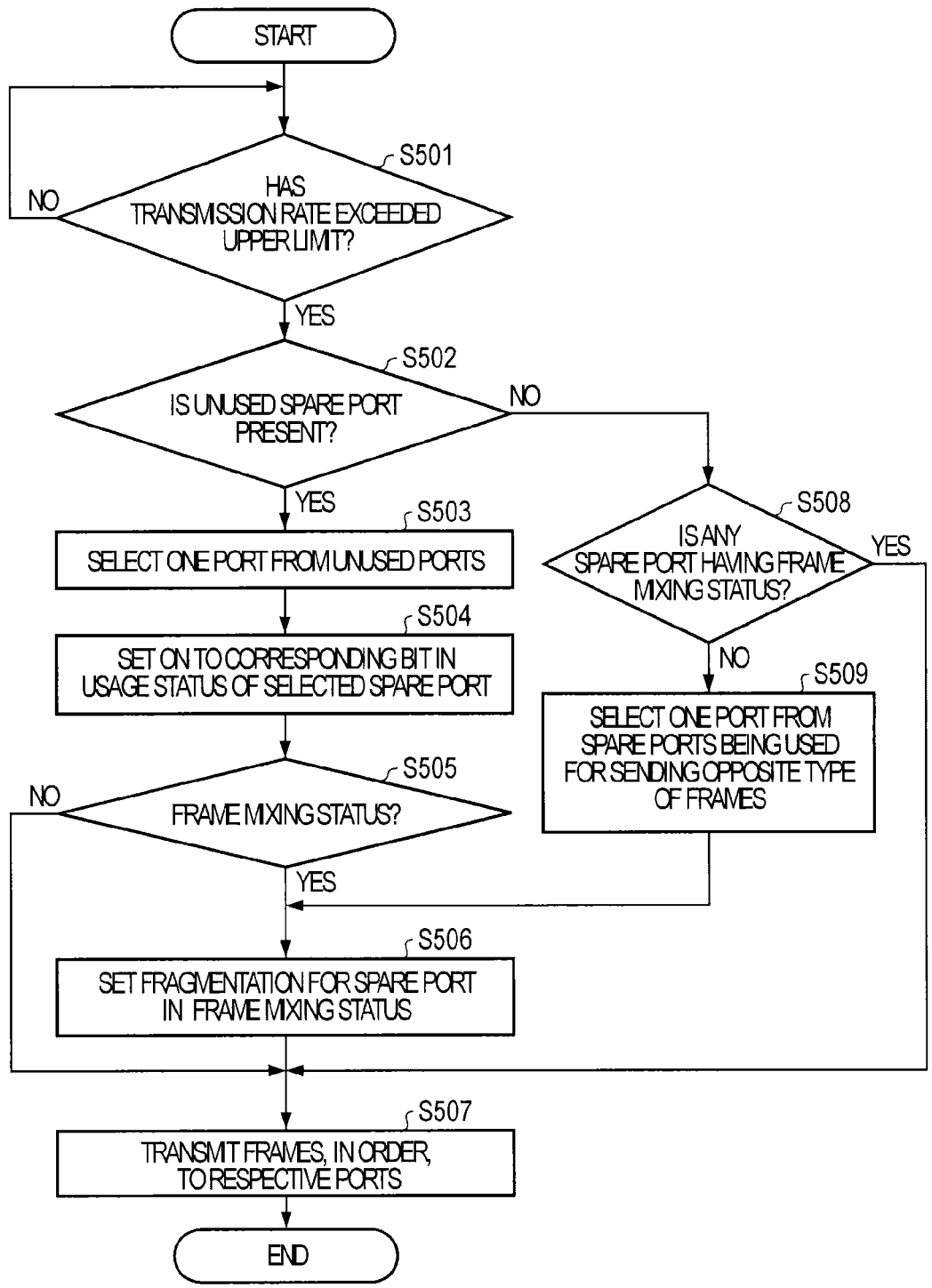
FIG. 13 is a diagram illustrating an example of a flow chart of processing on sorting destination extension, according to a second embodiment.

Description will be given of a processing flow for extending the sorting destination by the LAG sorting unit 40, with reference to FIG. 13. FIG. 13 is a diagram illustrating an example of a flowchart of processing for extending a sorting destination, according to a second embodiment.

The transmission rate checking units 71 or 73 detect whether the transmission rate has exceeded the upper limit (step S501). When the transmission rate has not exceeded the upper limit (step S501: NO), the transmission rate checking unit 71 or 73 continues to perform detecting.

When the transmission rate has exceeded the upper limit (step S501: YES), the transmission rate checking unit 71 or 73 reports the upper limit exceedance to the LAG sorting unit 40. The LAG sorting unit 40 determines whether there exists an unused spare port among the output IFs 92 to 94, by referring to the LAG sorting table 122 (step S502).

When there exist one or more unused spare ports (step S502: YES), the LAG sorting unit 40 selects one port from among the unused spare ports (step S503).

The LAG sorting unit 40 sets value "ON" to the bit corresponding to the upper limit exceeding frames in the usage status of the selected spare port in the LAG sorting table 122. (step S504).

Next, the LAG sorting unit 40 determines whether the usage status of the selected spare port indicates frame mixing, by referring to the LAG sorting table 122 (step S505). When the usage status indicates frame mixing (step S505: YES), the LAG sorting unit 40 instructs the fragmentation processing unit corresponding to the selected spare port to set fragmentation (step S506). Conversely, when the usage status does not indicate frame mixing (step S505: NO), the processing by the LAG sorting unit 40 proceeds to step S507.

Next, the LAG sorting unit 40 transmits frames, in order, to the respective ports, that is, to the port for transmitting upper limit exceeding frames and to the spare port to which the lower limit exceeding frames are sorted (step S507).

Meanwhile, when there is no unused spare port left (step S502: NO), the LAG sorting unit 40 determines whether there exists a spare port having the usage status indicating frame mixing (step S508). When there exists no spare port having the usage status indicating frame mixing (NO in step S508), the LAG sorting unit 40 selects one port from among the spare ports being used for transmitting frames of a type opposite to the upper limit exceeding type, as a sorting destination for the upper limit exceeding frames (step S509). Next the processing of the LAG sorting unit 40 proceeds to step S506.

Meanwhile, when there exists a spare port having the usage status indicating frame mixing (YES in step S508), the LAG sorting unit 40 does not perform extension of sorting destinations and the processing proceeds to step S507.

Figure 14:
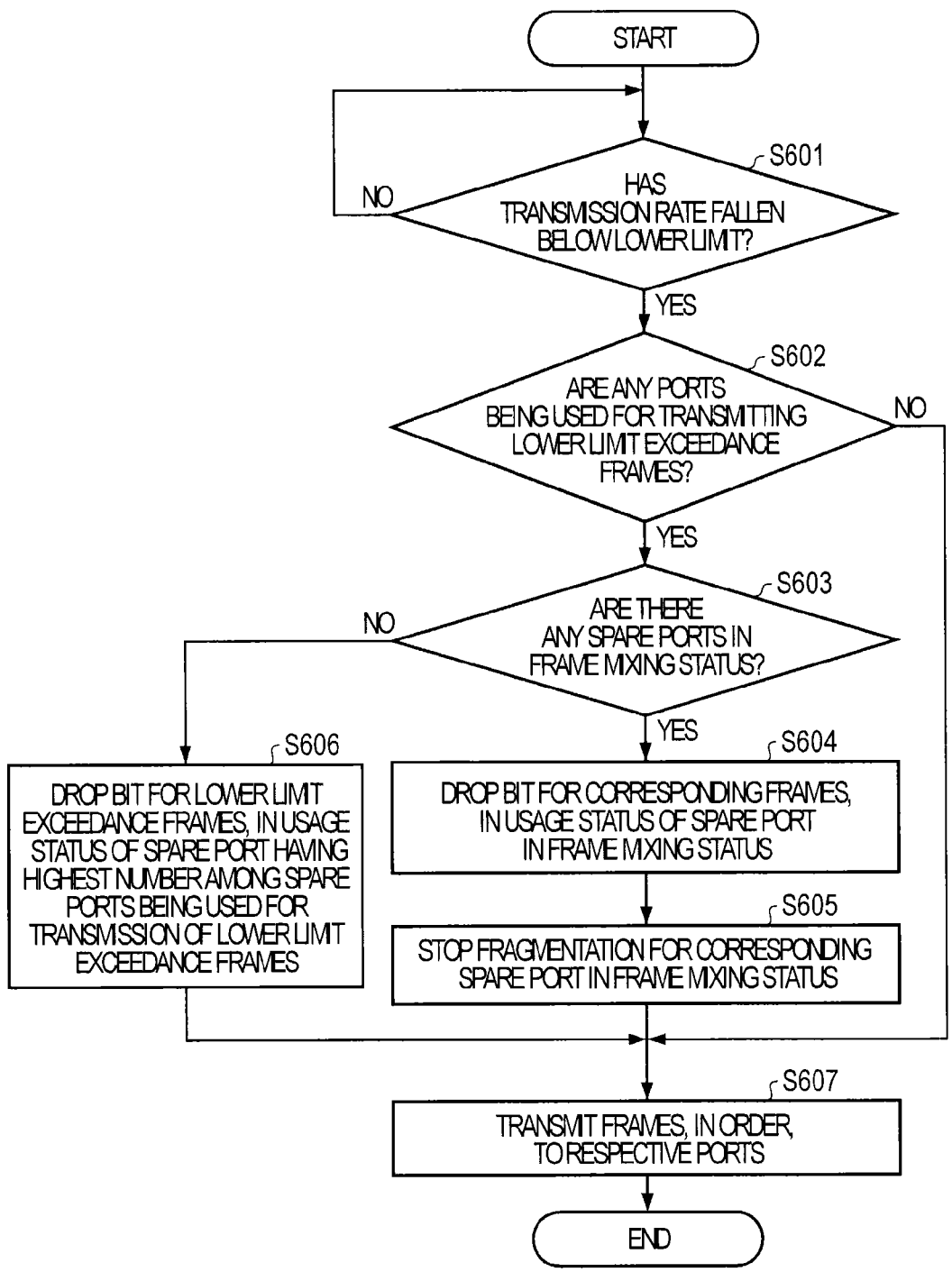
FIG. 14 is a diagram illustrating an example of a flow chart of processing on sorting destination retraction, according to a second embodiment.

Description will be given of a processing flow for retracting sorting destinations by the LAG sorting unit 40, with reference to FIG. 14. FIG. 14 is an example of a flowchart of processing for retracting sorting destinations, according to a second embodiment.

The transmission rate checking unit 71 or 73 detects whether the transmission rate has fallen below the lower limit (step S601). When the transmission rate does not have fallen below the lower limit (step S601: NO), the transmission rate checking unit 71 or 73 continue to perform detecting.

When the transmission rate has fallen below the lower limit (step S601: YES), the transmission rate checking unit 71 or 73 reports, to the LAG sorting unit 40, notification indicating that the transmission rate has fallen below the lower limit. The LAG sorting unit 40 determines whether there exists a spare port being used to transmit lower limit exceeding frames among the output IFs 92 to 94, by referring to the LAG sorting table 122 (step S602).

When there exists a spare port being used (step S602: YES), the LAG sorting unit 40 determines whether there exists a spare port having the usage status indicating frame mixing (step S603).

When there exists a frame mixing spare port (step S603: YES), the LAG sorting unit 40 drops the bit corresponding to the lower limit exceeding type, in the usage status of the frame mixing spare port (step S604).

The LAG sorting unit 40 then instructs the fragmentation processing unit corresponding to the frame mixing spare port to stop fragmentation processing (step S605).

Meanwhile, when there exists no frame mixing spare port (step S603: NO), the LAG sorting unit 40 selects a spare port having the highest number from among the spare ports being used for transmitting lower limit exceeding frames. The LAG sorting unit 40 drops the bit indicating the transmission of lower limit exceeding frames, in the usage status of the selected spare port in the LAG sorting table 122 (step S606). Then the processing of the LAG sorting unit 40 proceeds to step S607.

Meanwhile, when there exists no spare port being used to transmit lower limit exceeding frames (step S602: NO), the LAG sorting unit 40 does not perform sorting destination retraction processing, and the processing proceeds to step S607.

Next, the LAG sorting unit 40 sends frames, in order, to the two ports, that is, to the port for transmitting lower limit exceeding frames and to the spare port to which lower limit exceeding frames are to be sorted (step S607).

Description will be given of processing performed when the port link state is changed, with reference to FIGS. 15, 16, and 17. FIG. 15 illustrates the transition of a LAG sorting table when the link state of an unused spare port is changed. FIG. 16 illustrates the transition of a LAG sorting table when the link state of a used spare port is changed and an unused spare port remains. FIG. 17 illustrates the transition of a LAG sorting table when the link state of a used spare port is changed and no sortable spare port remains.

First, description will be given of processing performed when the link state of an unused port is changed, with reference to FIG. 15.

A table 410A represents the LAG sorting table 122 before a link state changes. In this case, the port X is unused since the bits indicating the usage status are "00" as depicted in the field 421.

When a link-down occurs in the unused port X, the LAG sorting unit 40 changes the value of the field 422 indicating the link state, from "UP" to "DOWN" as illustrated in a table 410*b*.

When the link of the unused port X recovers and enter a link-up state, the LAG sorting unit 40 changes the value of the field 422 of table 410*b* indicating the link state, from "DOWN" to "UP" as illustrated in the field 423 of table 410C. In this case, the LAG sorting unit 40 does not change the sorting destinations since the usage status indicates unused. As a result, no change occurs in the usage status of the port X.

Next, description will be given of processing performed when the link state of a used port is changed and an unused port remains, with reference to FIG. 16.

A table 410D represents the LAG sorting table 122 before the link state changes. In this case, the port X is unused since the bits indicating the usage status are "00" as depicted in the field 421

When a link-down occurs in the port Y that is in use, the LAG sorting unit 40 changes the value of the field 431 indicating the link state from "UP" to "DOWN" as illustrated in a table 410E. Moreover, the LAG sorting unit 40 selects another unused port for sorting the frames that have been sorted to the port Y. In this case, the LAG sorting unit 40 selects the port X. The LAG sorting unit 40 then changes the value of the field 433 indicating the usage status of the port Y from "10" to "00" meaning the unused status, and changes the value of the field 432 indicating the usage status of the port, X from "00" to "10" which is the same as the previous usage status of the port Y.

When the link of the port Y recovers and enters a link-up state, the LAG sorting unit 40 changes the value of the field 434 indicating the link state of the port Y from "DOWN" to "UP" as illustrated in table 410F. At this time, the LAG sorting unit 40 does not change the value of the field 435 indicating the usage status of the port X nor the value of the field 436 indicating the usage status of the port Y. That is, when the link state of the used spare port is down and an unused spare port remains, the LAG sorting unit 40 replaces the usage statuses with each other between the used spare port and the unused spare port, and continues to operate without changing the sorting destination even if the down link is recovered thereafter.

Next, description will be given of processing performed when the link state of a used port is changed and there exists no spare ports usable for sorting left, with reference to FIG. 17.

A table 410G represents the LAG sorting table 122 before the link state change. In this case, all the spare ports are down.

When a link-down occurs in the port V serving as a port for transmitting short frames, the LAG sorting unit 40 changes the value of the field 441 indicating the link state, from "UP" to "DOWN" as illustrated in a table 410H. Further, since there are no available ports left other than the port Z, the LAG sorting unit 40 determines to sort the short frames to the port Z that is an only available port despite the fact that the port Z is a port for transmitting long frames. The LAG sorting unit 40 then sets value "ON" to the bit indicating the transmission of short frames, in the field 442 indicating the usage status of the port Z. As a result, the value of the bits in the field 442 is changed from "10" to "11" meaning frame mixing.

When the link of the port V recovers and enters a link-up state, the LAG sorting unit 40 changes the value of the field 443 indicating the link state of the port V, from "DOWN" to "UP" as illustrated in a table 410I. The LAG sorting unit 40 then drops the bit indicating the transmission of short frames in the usage status of the port Z so that the value of the field 444 becomes "10." That is, when the link state of all the used spare ports are down and there is no unused spare port left, the LAG sorting unit 40 temporarily causes the port for short frames or the port for long frames to enter a frame mixing status. Thereafter, when the link is recovered, the LAG sorting unit 40 resumes operations by returning the status of the port to the original status.

Figure 18:
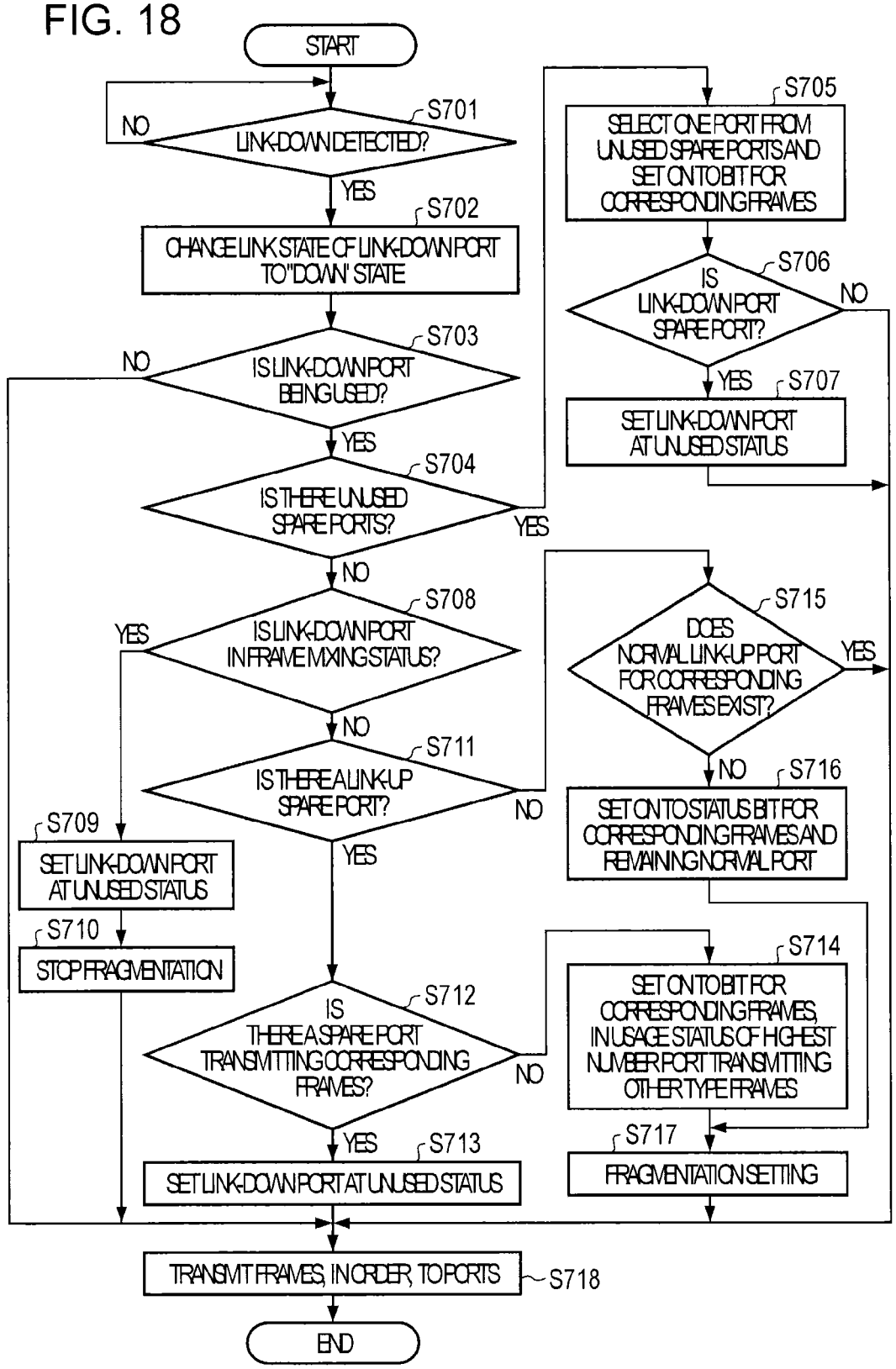
FIG. 18 is a diagram illustrating an example of a flow chart of processing performed when a link-down is detected, according to a second embodiment.

Description will be given of the processing flow performed when a link-down is detected, with reference to FIG. 18. FIG. 18 is a flow chart of processing performed when a link-down is detected according to a second embodiment.

The LAG sorting unit 40 determines whether a link-down is detected in any of the ports (step S701). When no link-down is detected (step S701: NO), the LAG sorting unit 40 continues to check for link-down while continuing operations.

Conversely, when a link-down is detected (step S701: YES), the LAG sorting unit 40 changes the link state of the link-down port to "DOWN" in the LAG sorting table 122 (step S702).

The LAG sorting unit 40 determines whether the link-down port is being used, by referring to the LAG sorting table 122. (step S703).

When the link-down port is being used (step S703: YES), the LAG sorting unit 40 determines whether there are one or more unused spare ports (step S704).

When there is one or more unused spare ports (step S704: YES), the LAG sorting unit 40 selects one of the unused spare ports. The LAG sorting unit 40 then sets, in the usage status of the selected port, value "ON" to the bit indicating the transmission of the same type of frames that have been transmitted by the link-down port (hereinbelow referred to as "corresponding frames") (step S705).

The LAG sorting unit 40 determines whether the link-down port is a spare port (step S706). When the link-down port is a spare port (step S706: YES), the usage status of the link-down port is changed to unused status (step S707). Conversely, when the link-down port is not a spare port (step S706: NO), the processing by the LAG sorting unit 40 proceeds to step S718.

Meanwhile, when there are no unused spare ports left (step S704: NO), the LAG sorting unit 40 determines whether the usage status of the link-down port is frame mixing (step S708).

When the usage status is frame mixing (step S708: YES), the LAG sorting unit 40 sets the usage status of the link-down port at unused status (step S709). The LAG sorting unit 40 then instructs the fragmentation processing unit corresponding to the link-down port to stop fragmentation processing (step S710).

Meanwhile, when the link-down port is not in a frame mixing status (step S708: NO), the LAG sorting unit 40 determines whether there are one or more spare ports being in a link-up state (step S711).

When there are no link-up spare port (step S711: YES), the LAG sorting unit 40 determines whether there is a spare port transmitting the corresponding frames (step S712).

When there is a spare port transmitting the corresponding frames (step S712: YES), the LAG sorting unit 40 sets the usage status of the link-down port at unused status (step S713).

Conversely, when there is no spare port transmitting the corresponding frames (step S712: NO), value "UP" is set to the bit indicating transmission of the corresponding frames, in the usage status of the spare port having the highest number among spare ports used for transmitting frames of a type opposite to the type of the corresponding frames (step S714).

When there is no spare port in a link-up state (step S711: NO), the LAG sorting unit 40 determines whether there exists a normal port that is used for transmitting the corresponding frames and in a linked-up state (step S715). When there exists the link-up normal port for the corresponding frames (step S715: YES), the processing of the LAG sorting unit 40 proceeds to step S718.

When there exists no normal port that is used for transmitting the corresponding frames and in a linked-up state (step S715: NO), the LAG sorting unit 40 sets value "ON" to the bit indicating transmission of the corresponding frames, in the usage status of the remaining normal port (step S716).

The LAG sorting unit 40 then instructs the fragmentation processing unit corresponding to the port for which the bit for the corresponding frames has been set at value "ON", to conduct fragmentation processing (step S717).

The LAG sorting unit 40 then transmits the frames, in order, to the ports (step S718).

Figure 19:
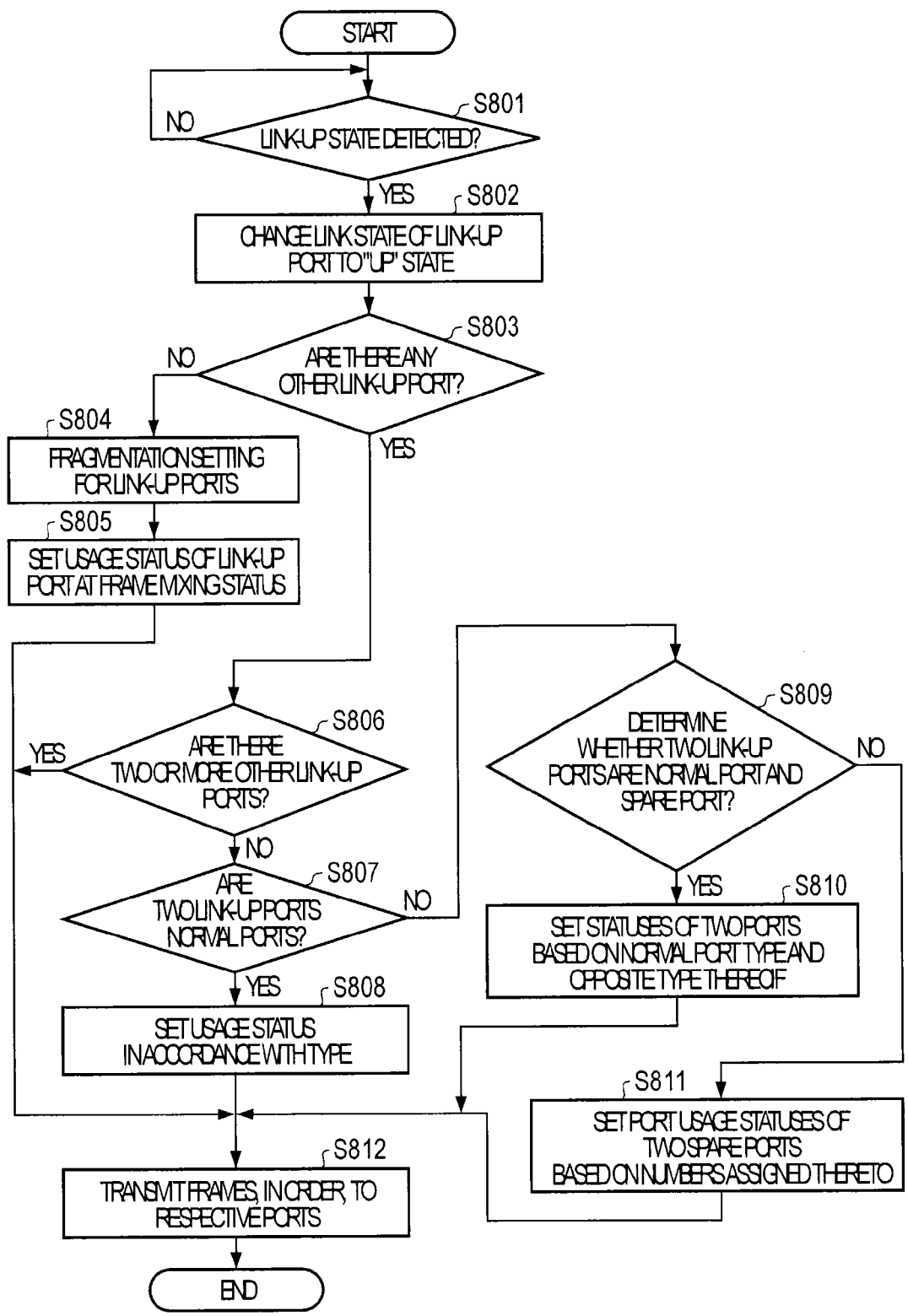
FIG. 19 is a diagram illustrating an example of a flow chart of processing performed when a link-up is detected, according to a second embodiment.

Next, description will be given of the processing flow when a link-up state is detected, with reference to FIG. 19. FIG. 19 is a flow chart of processing when a link-up state is detected, according to a second embodiment.

The LAG sorting unit 40 determines whether a link-up state of a link-down port is detected (step S801). When no link-up state is detected (step S801: NO), the LAG sorting unit 40 continues to check for a link-up state while continuing operations.

Meanwhile, when a link-up state is detected (step S801: YES), the LAG sorting unit 40 changes the link state of the linked-up port to "UP" status in the LAG sorting table 122 (step S802).

The LAG sorting unit 40 determines whether there are one or more other link-up ports (step S803).

When there are no other link-up ports (step S803: NO), the LAG sorting unit 40 instructs the fragmentation processing unit corresponding to the link-up port to conduct fragmentation processing (step S804). The LAG sorting unit 40 then sets the usage status of the link-up port at a frame mixing status (step S805).

When there are one or more other link-up ports (step S803: YES), the LAG sorting unit 40 determines whether there are two or more other link-up ports (step S806). When there are two or more other link-up ports (step S806: YES), the processing of the LAG sorting unit 40 proceeds to step S812.

When there is only one other link-up port (step S806: NO), the LAG sorting unit 40 determines whether the two link-up ports are both normal ports (step S807). When the two link-up ports are both normal ports (step S807: YES), the LAG sorting unit 40 sets the usage statuses of both the ports in accordance with the usage types thereof (step S808).

Meanwhile, when the two link-up ports are not both normal ports (step S807: NO), the LAG sorting unit 40 determines whether the two link-up ports are normal and spare ports, that is, whether one is a normal port and the other one is a spare port (step S809). When one of the two ports is a normal port and the other one is a spare port (step S809: YES), the LAG sorting unit 40 sets the usage statuses of two ports based on the normal port type and the opposite type, that is, sets the usage status of the normal port in accordance with the usage type thereof and sets the usage status of the spare port so that frames of a type opposite to that of the normal port are transmitted from the spare port (step S810).

Meanwhile, when the two ports are both spare ports (step S809: NO), the LAG sorting unit 40 sets the usage status of a first spare port having the lowest number so that short frames are transmitted from the first spare port, and sets the usage status of a second spare port having the highest number so that long frames are transmitted from the second spare port (step S811).

The LAG sorting unit 40 then transmits frames, in order, to the ports (step S812).

As described above, the data transmission device according to the second embodiment has a plurality of spare ports, and uses the spare ports, on order, to transmit short frames and long frames. Moreover, when frame mixing occurs in any one of the spare ports, fragmentation processing is performed on the long frames in that one of spare ports. As a result, in accordance with the operating status, each of the spare ports may be used as a spare port dedicated to transmitting short frames or dedicated to transmitting long frames, and furthermore, a frame mixing spare port may be appropriately determined. By adding spare ports and increasing the lines that configure the LAG, the frequency of fragmentation due to frame mixing may be reduced. Moreover, even if a spare port is down, operations may be continued by using another port.

(Embodiment 3)

Figure 20:
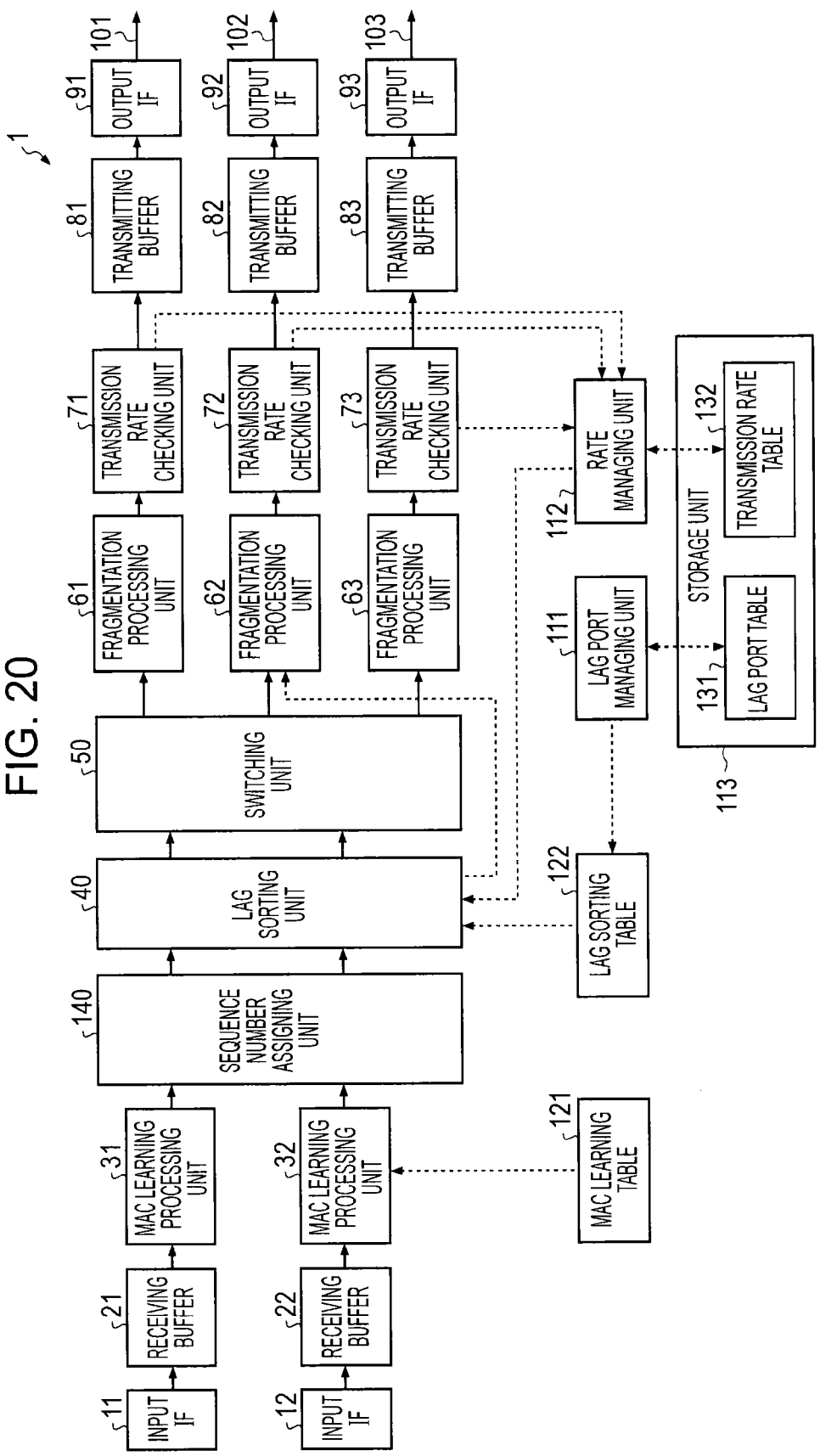
FIG. 20 is a diagram illustrating a configuration example of a data transmission device, according to a third embodiment.

Description will be given of a data transmission device according to a third embodiment. FIG. 20 is a block diagram illustrating an example of a data transmission device, according to a third embodiment. The data transmission device according to the third embodiment differs from the first embodiment in allocating sequence numbers to the frames. Functions that are the same as the first embodiment are omitted in the following explanation.

The data transmission device 1 according to the third embodiment further includes a sequence number assigning unit 140 that is added to the data transmission device of the first embodiment, as illustrated in FIG. 20.

Figure 21:
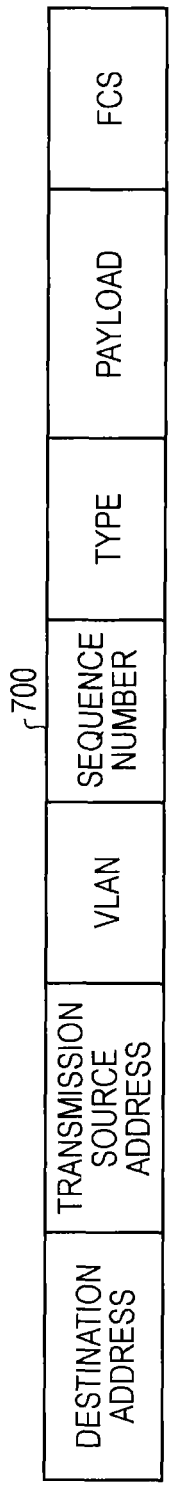
FIG. 21 is a diagram illustrating an example of a format of a frame assigned a sequence number, according to an embodiment.

The sequence number assigning unit 140 receives frames from the MAC learning processing units 31 and 32. The sequence number assigning unit 140 then assigns a sequence number 700 to the frames as illustrated in FIG. 21. The sequence number assigning unit 140 allocates a different sequence number for each VLAN. FIG. 21 is an example of a format of a frame assigned a sequence number. As illustrated in FIG. 21, each frame includes, for example, in addition to the sequence number 700, a destination address, a transmission source address, a VLAN identification number, a type, a payload, and a frame check sequence (FCS).

Figure 22:
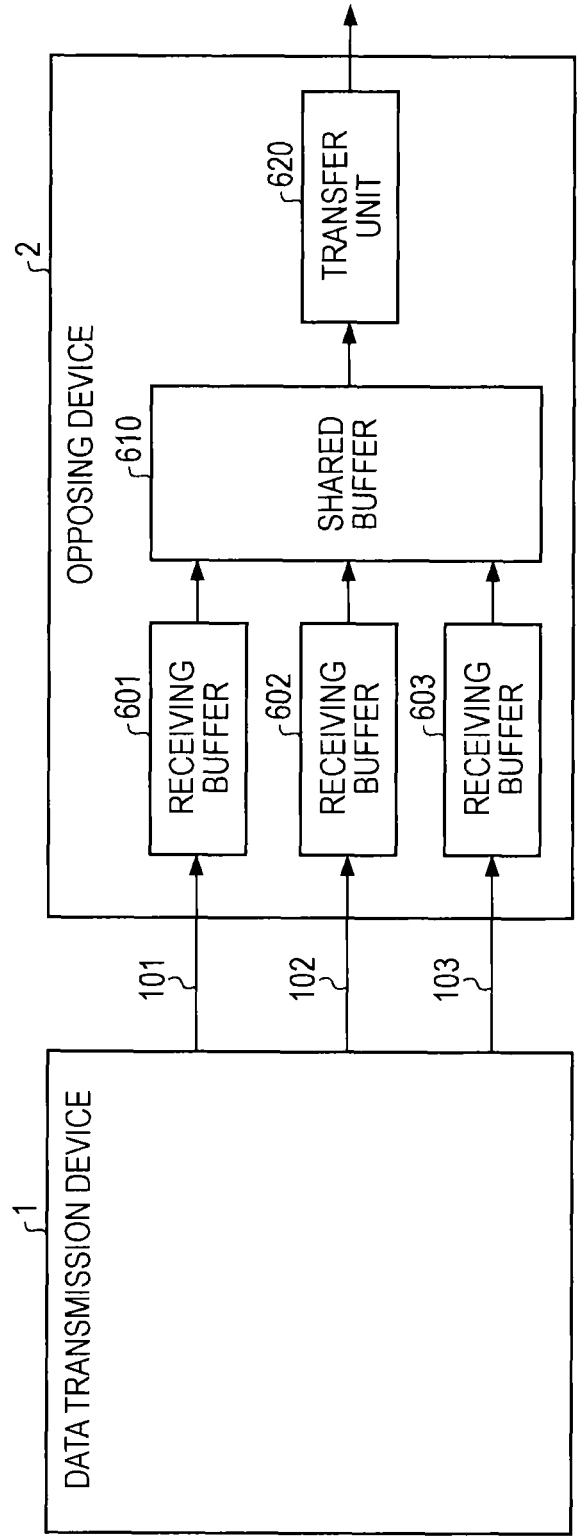
FIG. 22 is a diagram illustrating a configuration example of a data transmission system, according to a third embodiment.

The data transmission device 1 according to the third embodiment is connected to an opposing device 2 as illustrated in FIG. 22. The opposing device 2 may be another data transmission device or may be an information processing terminal. FIG. 22 is a block diagram illustrating an example of a data transmission system, according to a third embodiment.

The frames assigned with sequence numbers are output from the ports that configure the LAG of the data transmission device 1 and are input into the opposing device 2 via the lines 101 to 103. At this time, when there is a spare port being in a frame mixing status, the data transmission device 1 outputs the frames on which long frame fragmentation processing has been performed by the fragmentation processing unit corresponding to the spare port.

The opposing device 2 has ports that configure a LAG on the receiving side. Receiving buffers 601 to 603 are disposed for the respective ports. The receiving buffer 601 stores frames input from the line 101. The receiving buffer 602 stores frames input from the line 102. The receiving buffer 603 stores frames input from the line 103.

A shared buffer 610 reads out frames from all the receiving buffers 601 to 603, and stores the read frames in association with the respective VLANs.

A transfer unit 620 refers to the sequence numbers 700 included in the frames and reads out the frames according to the order of the sequence numbers and transfers the frames in order of reading out from the shared buffer 610. For example, when the opposing device 2 is a data transmission device, the frames are transferred to a processing unit for performing the next transmission.

As described above, in the data transmission system according to the third embodiment, a data transmission device transmits frames assigned with sequence numbers, and an opposing device that receives the frames processes the received frames according to the sequence numbers. As a result, the transmission of fragmented frames in the reverse order on the receiving side may be avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for fragmenting transmission data, the apparatus comprising:
   a first port to transmit first data having a data length less than a predetermined value;
   a second port to transmit second data having a data length not less than the predetermined value;
   a spare port;
   a hardware processor configured:
      to obtain a first determination result indicating whether input data is the first data or the second data,
      to obtain a second determination result indicating whether a transmission rate of each of the first and second ports is equal to or greater than a threshold, to sort the input data to one of the first, second, and spare ports, based on the first and second determination results, and to fragment the second data and transmit the fragmented second data to the spare port when both the first data and the second data are sorted to the spare port.

2. The apparatus of claim 1, wherein the first data is sorted to the first port when the transmission rate of the first port is less than the threshold;

the first data is sorted to the first port and the spare port when the transmission rate of the first port is not less than the threshold;

the second data is sorted to the second port when the transmission rate of the second port is less than the threshold; and the second data is sorted to the second port and the spare port when the transmission rate of the second port is not less than the threshold.

3. The apparatus of claim 1, wherein the apparatus includes a plurality of spare ports;

the hardware processor repeats a first process of selecting, when the transmission rate of the first port becomes not less than the threshold, a port to which the first data is to be sorted, from among the plurality of spare ports;

the hardware processor repeats a second process of selecting, when the transmission rate of the second port becomes not less than the threshold, a port to which the second data is to be sorted, from among the plurality of spare ports; and when there are no unselected spare ports left, the hardware processor mixing the first and second data and transmits the mixed first and second data to a spare port that has been selected last.

4. The apparatus of claim 1, wherein:

the first port, the second port, and the spare port constitute one logical port.

5. The apparatus of claim 1, wherein the hardware processor assigns a sequence number to the input data in order of being input to the apparatus.

6. A system for fragmenting transmission data, the system comprising:

a data transmission device including:

a first port to transmit first data having a data length less than a predetermined value, a second port to transmit second data having a data length not less than the predetermined value, and a spare port; and a data receiving device, wherein the data transmission device is configured:

to assign a sequence number to input data in order of being input to the data transmission device, to obtain a first determination result indicating whether the input data is the first data or the second data, to obtain a second determination result indicating whether a transmission rate of each of the first and second ports is equal to or greater than a threshold, to sort the input data to one of the first, second, and spare ports, based on the first and second determination results, and to fragment the second data and transmit the fragmented second data to the spare port when both the first data and the second data are sorted to the spare port; and the data receiving device is configured:

to receive the input data from at least one of the first, second, and spare ports, and to process the input data in order of the sequence number assigned to the input data.

7. A method for fragmenting transmission data, the method comprising:

determining whether input data is first data having a data length less than a predetermined value or second data having a data length not less than the predetermined value;

transmitting the input data from a first port when the input data is the first data;

transmitting the input data from a second port when the input data is the second data;

determining whether a transmission rate of each of the first and second ports is equal to or greater than a threshold;

transmitting the input data from a spare port, based on a result of the determining; and fragmenting the second data and transmitting the fragmented second data from the spare port when both the first data and the second data are transmitted from the spare port.

* * * * *

UNITED STATES PATENT AND TRADEMARK OFFICE
CERTIFICATE OF CORRECTION

PATENT NO. : 8,880,759 B2
APPLICATION NO. : 13/789851
DATED : November 4, 2014
INVENTOR(S) : Takuya Maeda et al.

It is certified that error appears in the above-identified patent and that said Letters Patent is hereby corrected as shown below:

On the title page

Column 1, Item [72] (Inventors), Line 1, Delete "Tetuya" and insert -- Tetsuya --, therefor.

Signed and Sealed this
Third Day of March, 2015

Michelle K. Lee
*Deputy Director of the United States Patent and Trademark Office*